US012521750B2

(12) United States Patent

Li et al.

(10) Patent No.: US 12,521,750 B2

(45) Date of Patent: *Jan. 13, 2026

(54) ATOMIZATION DEVICE WITH IMPROVED ASSEMBLING FEATURES

(71) Applicant: Luxshare Precision Industry Company Limited, Shenzhen (CN)

(72) Inventors: Huabing Li, Shenzhen (CN); Zhongyuan Lai, Shenzhen (CN); Hongbing Yin, Shenzhen (CN)

(73) Assignee: LUXSHARE PRECISION INDUSTRY COMPANY LIMITED, Shenzhen (CN)

( * ) Notice: Subject to any disclaimer, the term of this patent is extended or adjusted under 35 U.S.C. 154(b) by 156 days.

This patent is subject to a terminal disclaimer.

(21) Appl. No.: 18/505,073

(22) Filed: Nov. 8, 2023

(65) Prior Publication Data

US 2024/0326078 A1 Oct. 3, 2024

(30) Foreign Application Priority Data

Mar. 30, 2023 (CN) ......................... 202310366274.1

(51) Int. Cl.

*B05B 17/06* (2006.01)
*B05B 11/00* (2023.01)
*B05B 15/63* (2018.01)

(52) U.S. Cl.

CPC .......... *B05B 17/06* (2013.01); *B05B 11/0002* (2013.01); *B05B 15/63* (2018.02)

(58) Field of Classification Search

CPC .......... A24F 40/10; A24F 40/40; A24F 40/42; B05B 11/0002; B05B 15/63; B05B 17/06; Y02E 60/10

See application file for complete search history.

(56) References Cited

U.S. PATENT DOCUMENTS

| | | | | |
|---|---|---|---|---|
| 9,586,228 | B2 * | 3/2017 | Roemburg | A61L 9/127 |
| 10,326,220 | B1 * | 6/2019 | Most | A24F 40/40 |
| 12,279,652 | B2 * | 4/2025 | Zhao | A24F 40/42 |
| 2016/0316820 | A1 | 11/2016 | Liu | |
| 2018/0070636 | A1 | 3/2018 | Ruscio et al. | |
| 2018/0279682 | A1 | 10/2018 | Guo et al. | |
| 2020/0046031 | A1 | 2/2020 | Bernauer et al. | |
| 2021/0153567 | A1 | 5/2021 | Twite et al. | |

(Continued)

FOREIGN PATENT DOCUMENTS

| | | |
|---|---|---|
| CN | 205146559 U | 4/2016 |
| CN | 206079042 U | 4/2017 |

(Continued)

*Primary Examiner* — Jesse S Bogue

(74) *Attorney, Agent, or Firm* — Cheng-Ju Chiang

(57) ABSTRACT

An atomization device includes a housing assembly and a handle assembly. The handle assembly includes a casing assembly and a battery assembly at least partially installed in the casing assembly. The casing assembly includes an extending protrusion, a first conductive piece and a second conductive piece. The battery assembly includes a docking boss, a built-in circuit board, a battery, a first conductive terminal and a second conductive terminal. The docking boss is inserted into a receiving groove, so that the first conductive terminal and the second conductive terminal are respectively in contact with the first conductive piece and the second conductive piece.

10 Claims, 26 Drawing Sheets

(56) References Cited

U.S. PATENT DOCUMENTS

| | | | | |
|---|---|---|---|---|
| 2021/0267277 | A1 | 9/2021 | Qiu | |
| 2021/0378306 | A1 | 12/2021 | Angell et al. | |
| 2022/0191979 | A1 | 6/2022 | Sayed et al. | |
| 2023/0044795 | A1* | 2/2023 | Li | A24F 40/485 |
| 2024/0049785 | A1* | 2/2024 | Li | H01M 50/284 |
| 2024/0237755 | A1* | 7/2024 | Kim | A24F 40/40 |
| 2024/0260673 | A1* | 8/2024 | Tang | A24F 40/48 |
| 2024/0324666 | A1* | 10/2024 | Li | A24F 40/05 |
| 2024/0324671 | A1* | 10/2024 | Li | A61M 15/0085 |
| 2024/0326079 | A1* | 10/2024 | Li | B05B 15/63 |
| 2024/0332717 | A1* | 10/2024 | Li | H01M 50/284 |

FOREIGN PATENT DOCUMENTS

| | | | | | |
|---|---|---|---|---|---|
| CN | 106617322 | A | | 5/2017 | |
| CN | 208723137 | U | | 4/2019 | |
| CN | 209498585 | U | | 10/2019 | |
| CN | 210432842 | U | | 5/2020 | |
| CN | 111657555 | A | | 9/2020 | |
| CN | 212590271 | U | | 2/2021 | |
| CN | 112568510 | A | | 3/2021 | |
| CN | 112790435 | A | | 5/2021 | |
| CN | 113142680 | A | | 7/2021 | |
| CN | 214013182 | U | | 8/2021 | |
| CN | 214428734 | U | | 10/2021 | |
| CN | 113678307 | A | | 11/2021 | |
| CN | 214594173 | U | | 11/2021 | |
| CN | 215583161 | U | | 1/2022 | |
| CN | 114405699 | A | | 4/2022 | |
| CN | 216147242 | U | | 4/2022 | |
| CN | 114532594 | A | * | 5/2022 | A24F 40/40 |
| CN | 114668179 | A | | 6/2022 | |
| CN | 216701660 | U | | 6/2022 | |
| CN | 216796487 | U | | 6/2022 | |
| CN | 217065397 | U | | 7/2022 | |
| CN | 114847527 | A | | 8/2022 | |
| CN | 217089624 | U | | 8/2022 | |
| CN | 217364693 | U | | 9/2022 | |
| CN | 115155925 | A | | 10/2022 | |
| CN | 115191671 | A | | 10/2022 | |
| CN | 217525992 | U | | 10/2022 | |
| CN | 217937239 | U | | 12/2022 | |
| CN | 217937252 | U | | 12/2022 | |
| CN | 218474076 | U | | 2/2023 | |
| CN | 218737244 | U | | 3/2023 | |
| CN | 220140824 | U | | 12/2023 | |
| CN | 220211927 | U | * | 12/2023 | |
| CN | 220255725 | U | | 12/2023 | |
| CN | 220258458 | U | | 12/2023 | |
| TW | I548461 | B | | 9/2016 | |
| TW | I786851 | B | | 12/2022 | |
| WO | 2015/010278 | A1 | | 1/2015 | |
| WO | 2015/042790 | A1 | | 4/2015 | |
| WO | 2015/096107 | A1 | | 7/2015 | |
| WO | WO-2015161406 | A1 | * | 10/2015 | A24F 40/40 |
| WO | 2016/123779 | A1 | | 8/2016 | |
| WO | 2016/150979 | A1 | | 9/2016 | |
| WO | WO-2017143865 | A1 | * | 8/2017 | A24F 40/57 |
| WO | 2018/000368 | A1 | | 1/2018 | |
| WO | 2018/024213 | A1 | | 2/2018 | |
| WO | 2020/038326 | A1 | | 2/2020 | |
| WO | 2021/184876 | A1 | | 9/2021 | |
| WO | 2022/104593 | A1 | | 5/2022 | |

* cited by examiner

ATOMIZATION DEVICE WITH IMPROVED ASSEMBLING FEATURES

CROSS-REFERENCE TO RELATED APPLICATION

This patent application claims priority of a Chinese Patent Application No. 202310366274.1, filed on Mar. 30, 2023 and titled "ATOMIZATION DEVICE", the entire content of which is incorporated herein by reference.

TECHNICAL FIELD

The present disclosure relates to an atomization device configured to atomize a substance into a gaseous state by heating or vibrating.

BACKGROUND

The atomization device in the related art usually includes an incentive assembly, a built-in circuit board and a battery. The incentive assembly and the built-in circuit board are usually fixed by means of welding or the like, which is not beneficial to improve the assembly efficiency and has poor maintainability.

SUMMARY

An object of the present disclosure is to provide an atomization device that is easy to assemble.

In order to achieve the above object, the present disclosure adopts the following technical solution: an atomization device, comprising:

a housing assembly comprising a first housing portion and an incentive assembly at least partially located in the first housing portion; the incentive assembly comprising an incentive element, a first wire and a second wire connected to the incentive element, and a first conductive piece and a second conductive piece connected to the first wire and the second wire, respectively; the first conductive piece comprising a first contact portion; the second conductive piece comprising a second contact portion; and a handle assembly comprising a casing assembly and a battery assembly at least partially installed in the casing assembly; the casing assembly comprising a second housing portion; the second housing portion comprising an arc-shaped groove and an extending protrusion protruding into the arc-shaped groove; the extending protrusion comprising a first wall portion, a second wall portion opposite to the first wall portion, and a receiving groove located between the first wall portion and the second wall portion; the first conductive piece and the second conductive piece being fixed on the extending protrusion; the first contact portion and the second contact portion being respectively located on two sides of the receiving groove, and are exposed in the receiving groove;

wherein the battery assembly comprises a mounting seat, a built-in circuit board installed on the mounting seat, a battery installed on the mounting seat and electrically connected to the built-in circuit board, and a first conductive terminal and a second conductive terminal electrically connected to the built-in circuit board; the first conductive terminal comprises a first elastic arm; the second conductive terminal comprises a second elastic arm; and wherein the mounting seat comprises a docking boss; the docking boss comprises a first outer surface and a second outer surface opposite to the first outer surface; the first elastic arm protrudes beyond the first outer surface; the second elastic arm protrudes beyond the second outer surface; the docking boss is inserted into the receiving groove, so that the first elastic arm is in contact with the first contact portion, and the second elastic arm is in contact with the second contact portion.

Optionally, the first contact portion and the second contact portion are both of flat plate configurations.

Optionally, the first conductive piece comprises a first connecting portion; the first connecting portion defines a first fixing hole to receive the first wire; the first connecting portion is pressed against and fixed to the first wire; and wherein the second conductive piece comprises a second connecting portion; the second connecting portion defines a second fixing hole to receive the second wire; the second connecting portion is crimped and fixed to the second wire.

Optionally, a distance between the first contact portion and the second contact portion is greater than a distance between the first connecting portion and the second connecting portion.

Optionally, the first conductive piece comprises a first fixing portion extending from the first contact portion and a first adjusting portion bent from the first fixing portion toward the second conductive piece; the first connecting portion integrally extends from the first adjusting portion;

the first wall portion defines a first holding groove to fix the first fixing portion;

the second conductive piece comprises a second fixing portion extending from the second contact portion and a second adjusting portion bent from the second fixing portion toward the first conductive piece; the second connecting portion integrally extends from the second adjusting portion;

the second wall portion defines a second holding groove to fix the second fixing portion.

Optionally, the first fixing hole extends along a direction perpendicular to a wall surface of the first adjusting portion; the first adjusting portion is configured to limit a position of the first wire when the first wire is inserted into the first fixing hole; and wherein the second fixing hole extends along a direction perpendicular to a wall surface of the second adjusting portion; the second adjusting portion is configured to limit a position of the second wire when the second wire is inserted into the second fixing hole.

Optionally, the docking boss comprises a first fixing slot and a second fixing slot;

the first conductive terminal comprises a first base portion and a first claw; the first elastic arm and the first claw are integrally extended from two ends of the first base portion; the first base portion is fixed in the first fixing slot; the first claw extends beyond the docking boss to engage with the built-in circuit board;

the second conductive terminal comprises a second base portion and a second claw; the second elastic arm and the second claw are integrally extended from two ends of the second base portion; the second base portion is fixed in the second fixing slot; the second claw extends beyond the docking boss to engage with the built-in circuit board.

Optionally, the first claw comprises a first locking groove and a plurality of first abutment teeth exposed in the first locking groove; the built-in circuit board is partially inserted in the first locking groove; the first abutment teeth clamp the built-in circuit board and are in contact with a conductive metal pad on the built-in circuit board; and wherein the second claw comprises a second locking groove and a plurality of second abutment teeth exposed in the second locking groove; the built-in circuit board is partially inserted into the second locking groove; the second abutment teeth clamp the built-in circuit board and are in contact with a conductive metal pad on the built-in circuit board.

Optionally, the first housing portion comprises an installation cavity and an atomizing nozzle located on one side of the installation cavity;

the atomization device further comprises a liquid storage cartridge assembly detachably assembled in the installation cavity; the liquid storage cartridge assembly comprising a liquid storage cartridge shell, a liquid storage cotton detachably installed in the liquid storage cartridge shell, and an end cover that cooperates with the liquid storage cartridge shell to limit a position of the liquid storage cotton; the incentive element is configured to heat or vibrate the liquid storage cartridge assembly, so as to atomize a substance adsorbed in the liquid storage cotton into a gaseous state, and flow out from the atomizing nozzle.

Optionally, the mounting seat comprises a plurality of first gripping claws and a plurality of second gripping claws; the plurality of first gripping claws and the plurality of second gripping claws embrace the battery.

Compared with the prior art, the housing assembly of the present disclosure is provided with the extending protrusion, and the first conductive piece and a second conductive piece fixed on the extending protrusion. The battery assembly includes the docking boss, and the first conductive terminal and the second conductive terminal fixed on the docking boss. By inserting the docking boss into the receiving groove of the extending protrusion, the first conductive terminal and the second conductive terminal are in contact with the first conductive piece and the second conductive piece, respectively, which omits a welding process and improves assembly efficiency. In addition, this detachable design also improves the maintainability of the atomization device.

DETAILED DESCRIPTION

Figure 1:
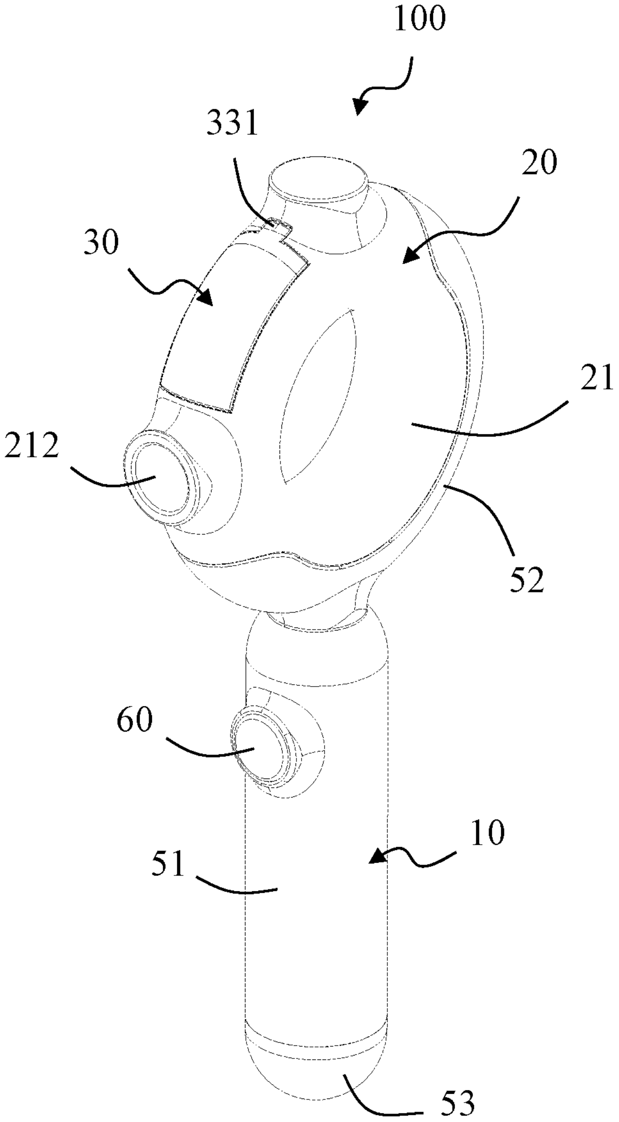
FIG. 1 is a schematic perspective view of an atomization device in accordance with an embodiment of the present disclosure.
Figure 2:
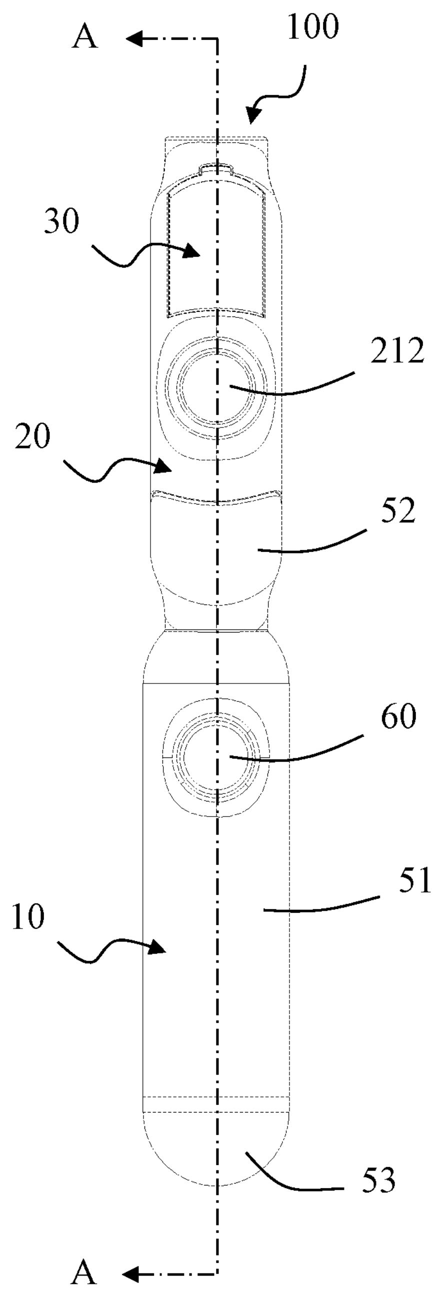
FIG. 2 is a left view of FIG. 1.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 29, the present disclosure discloses an atomization device 100. The atomization device 100 is applicable in different fields according to different situations, such as a medical drug atomizer, an electronic cigarette, and the like. In the illustrated embodiment of the present disclosure, the atomization device 100 includes a handle assembly 10, a housing assembly 20 assembled in the handle assembly 10, and a liquid storage cartridge assembly 30 detachably assembled to the housing assembly 20.

Referring to FIG. 5, and FIG. 10 to FIG. 14, in the illustrated embodiment of the present disclosure, the liquid storage cartridge assembly 30 includes a liquid storage cartridge shell 31, a liquid storage cotton 32 detachably installed in the liquid storage cartridge shell 31, and an end cover 33 that cooperates with the liquid storage cartridge shell 31 to limit a position of the liquid storage cotton 32.

The liquid storage cartridge shell 31 includes a first body portion 311, a protruding portion 312 protruding beyond one side of the first body portion 311, an installation opening 313 opposite to the protruding portion 312. The first body portion 311 includes a first receiving cavity 3111 communicating with the installation opening 313, a first arc-shaped wall 3112 located on one side (for example, a top side) of the first receiving cavity 3111, and a second arc-shaped wall 3113 located on an opposite side (for example, a bottom side) of the first receiving cavity 3111. The protruding portion 312 defines a second receiving cavity 3121 communicating with the first receiving cavity 3111 and a gas outlet 3120 communicating with the second receiving cavity 3121. In the illustrated embodiment of the present disclosure, the protruding portion 312 integrally extends from a bottom of the first body portion 311. The protruding portion 312 is provided with a rotating hinged circular surface 3122 and an annular rib 3123 protruding beyond a side of the protruding portion 312.

The liquid storage cotton 32 is received in the first receiving cavity 3111 and the second receiving cavity 3121 from the installation opening 313. The liquid storage cotton 32 is used to absorb a substance (such as a liquid substance). The liquid storage cotton 32 is exposed to the gas outlet 3120. In one embodiment of the present disclosure, the liquid storage cotton 32 is a mesh structure polymer fiber oil storage cotton. The end cover 33 is sealed and fixed on the liquid storage cartridge shell 31 so as to close the installation opening 313. In one embodiment of the present disclosure, the end cover 33 is made of soft sealing rubber. The end cover 33 is provided with a positioning rib 331.

Compared with the related art, the liquid storage cartridge assembly 30 of the present disclosure is detachably assembled to the housing assembly 20, so that it is convenient to disassemble, clean and replace the liquid storage cartridge assembly 30. In addition, by providing the end cover 33 detachably assembled on the liquid storage cartridge shell 31, it is also convenient to disassemble, clean and replace the liquid storage cotton 32 in the liquid storage cartridge assembly 30. Through the design of the present disclosure, the liquid storage cartridge assembly 30 can be repeatedly disassembled, cleaned, and filled with different medicaments or other solutions, which greatly improves the maintenance convenience of the liquid storage cartridge assembly 30.

Referring to FIG. 5 to FIG. 7, FIG. 16, FIG. 17 and FIG. 19, the housing assembly 20 includes a substantially circular first housing portion 21 and an incentive assembly 22 at least partially mounted in the first housing portion 21. The first housing portion 21 includes a body portion 211, an installation cavity 210 extending through one end of the body portion 211 (for example, upward or obliquely upward), and an atomizing nozzle 212 located on one side of the installation cavity 210 and protruding beyond the body portion 211. The body portion 211 includes a circular opening 2110 in the middle, a first installation wall 2111 located at a bottom of the atomizing nozzle 212, a second installation wall 2112 located outside the circular opening 2110 and extending radially, a third installation wall 2113 located outside the circular opening 2110 and extending radially, and a post 2114 protruding beyond the third installation wall 2113. The body portion 211 further includes a positioning groove 2119 disposed on a top of the second installation wall 2112. The positioning groove 2119 is configured to receive the positioning rib 331.

Figure 14:
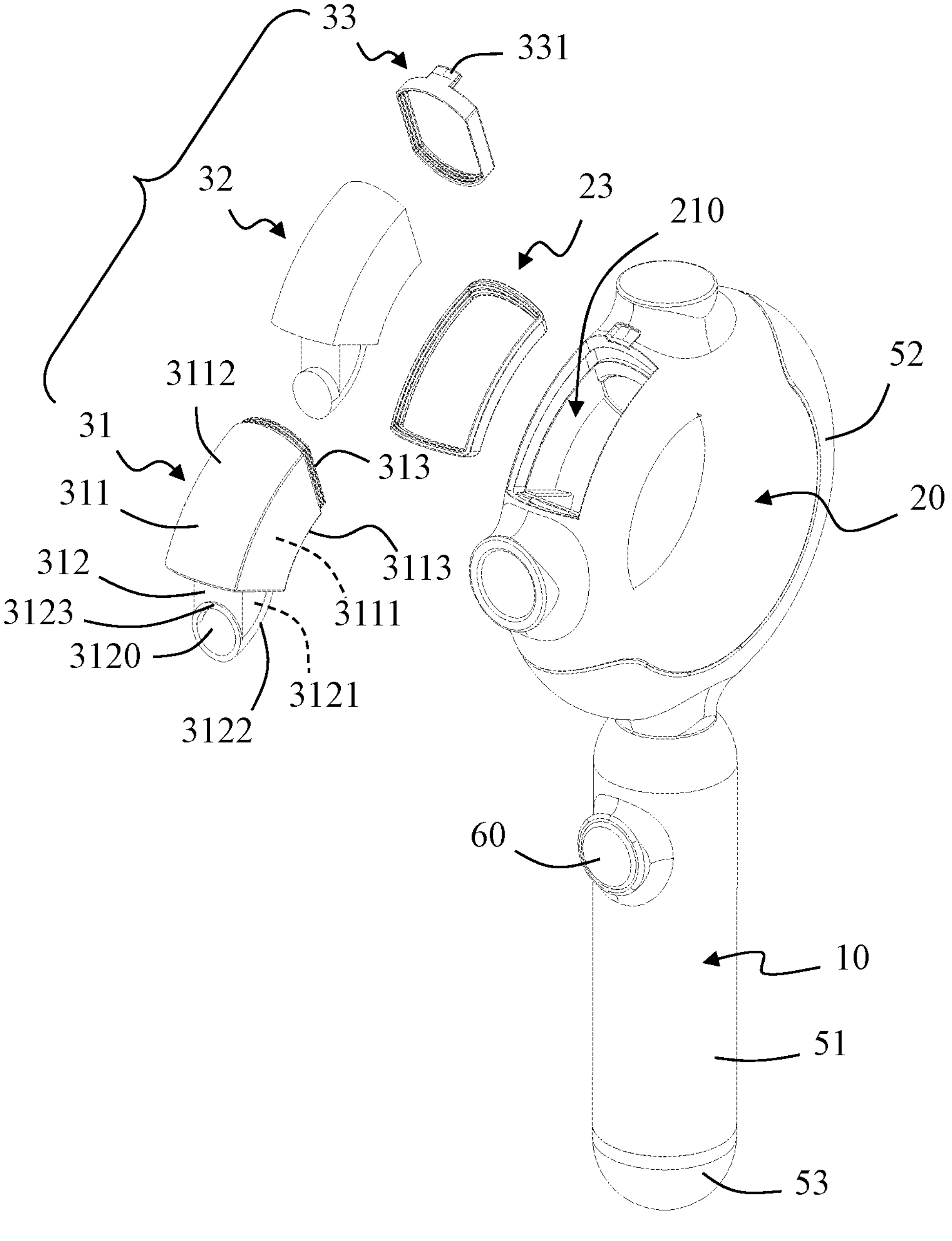
FIG. 14 is a partial perspective exploded view of FIG. 1.
Figure 26:
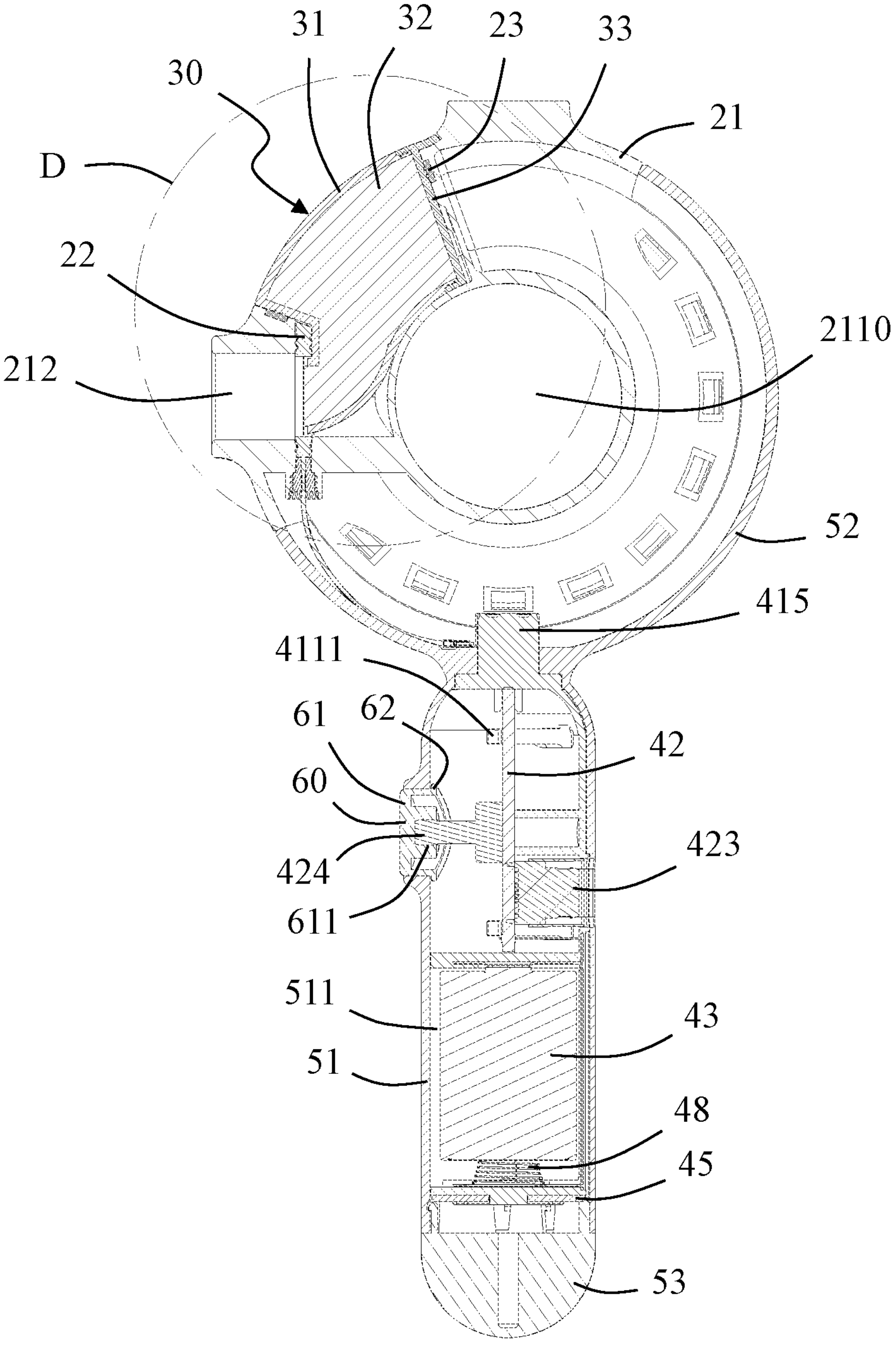
FIG. 26 is a schematic sectional view taken along line A-A in FIG. 2.
Figure 27:
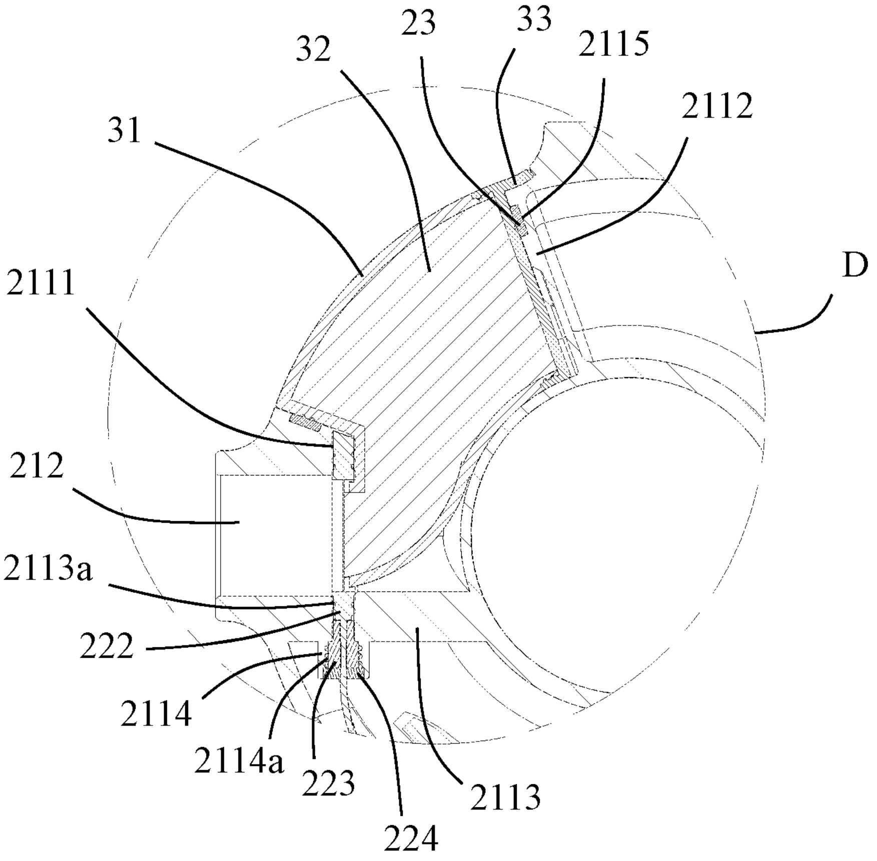
FIG. 27 is a partially enlarged view of a circled portion D in FIG. 26.
Figure 28:
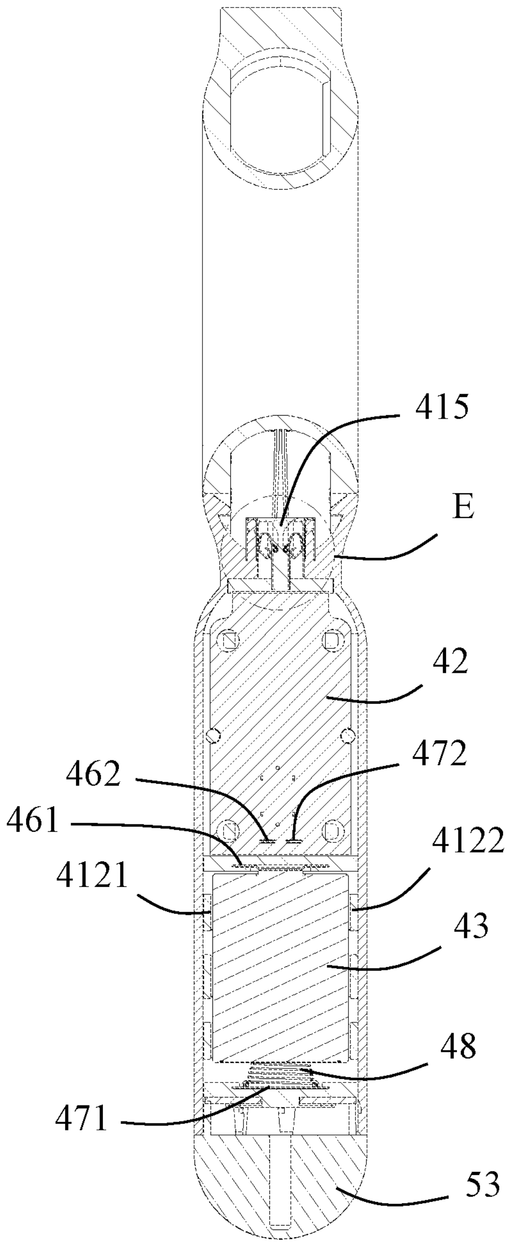
FIG. 28 is a schematic cross-sectional view taken along line B-B in FIG. 3.

Referring to FIG. 14, FIG. 26 and FIG. 27, the housing assembly 20 includes a first sealing member 23 located in the installation cavity 210. The first sealing member 23 is mounted on the body portion 211. In the illustrated embodiment of the present disclosure, the body portion 211 is provided with an annular groove 2115 communicating with the installation cavity 210. The first sealing member 23 is installed in the annular groove 2115. In the illustrated embodiment of the present disclosure, the first sealing member 23 is of a frame-shaped configuration. The liquid storage cartridge assembly 30 partially passes through the first sealing member 23 to realize sealing installation on the housing assembly 20.

Referring to FIG. 26 and FIG. 27, the third installation wall 2113 is provided with a first installation through hole **2113*a*. The post 2114 is provided with a second installation through hole 2114*a* communicating with the first installation through hole 2113*a*. The first installation through hole 2113*a* extends through one side of the third installation wall 2113, and the second installation hole 2114*a* extends through another side of the post 2114**.

Figure 5:
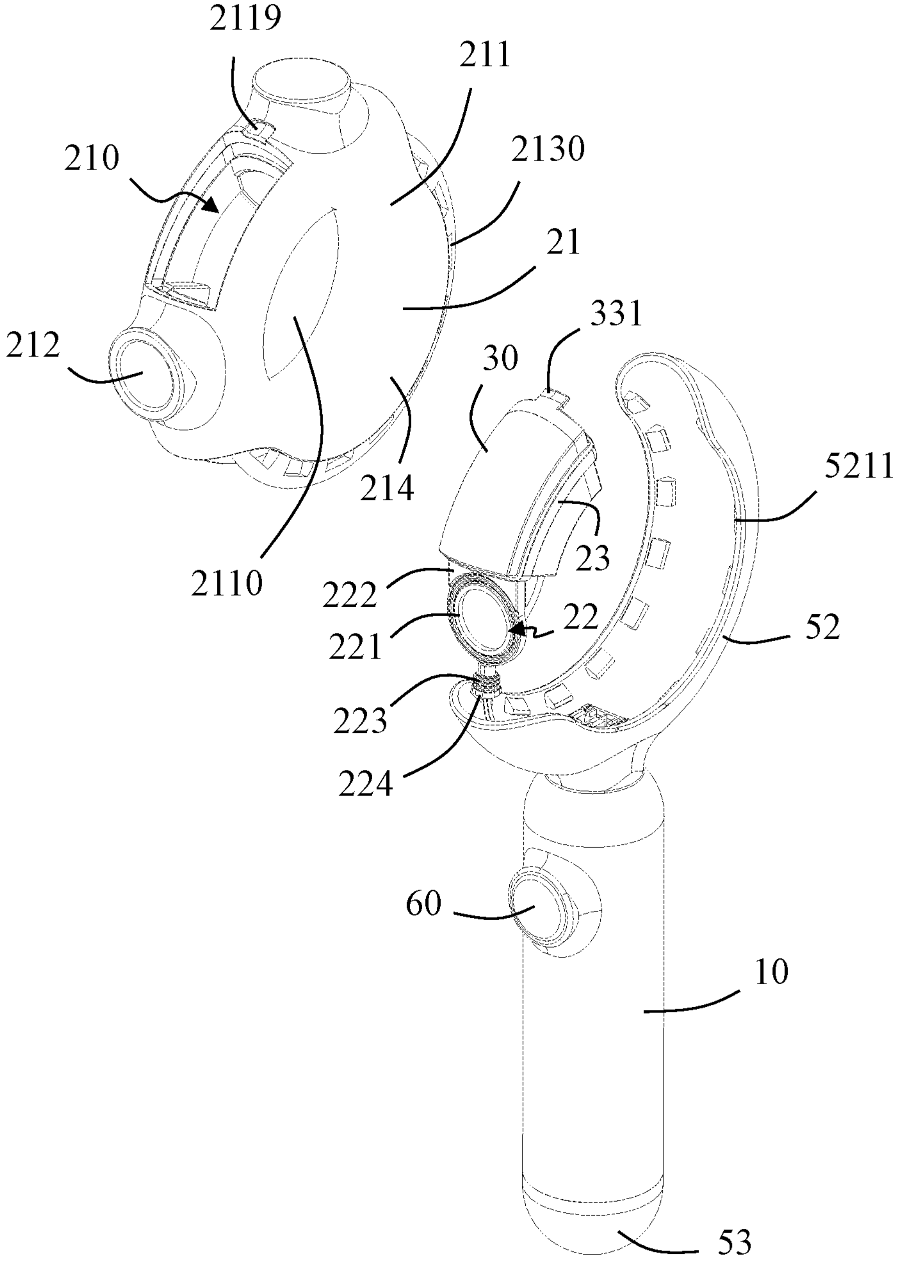
FIG. 5 is a partial perspective exploded view of FIG. 1, wherein the first housing portion is separated.
Figure 6:
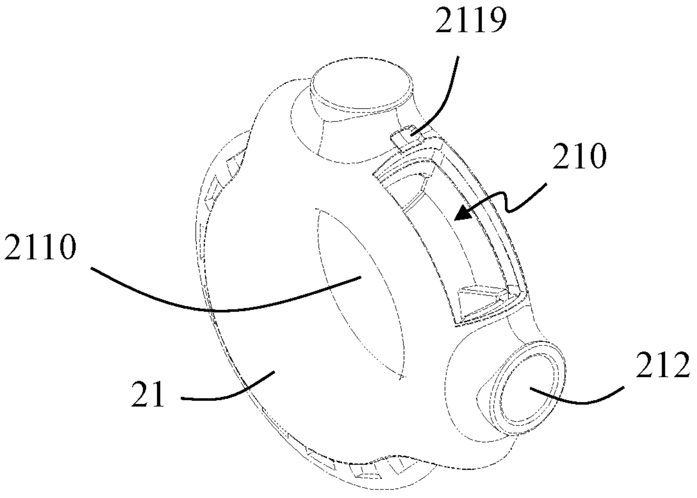
FIG. 6 is a schematic perspective view of the first housing portion in FIG. 5 from another angle.
Figure 7:
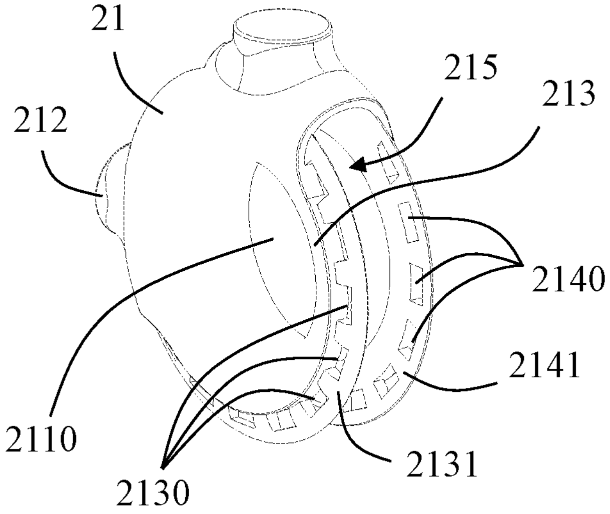
FIG. 7 is a schematic perspective view of the first housing portion in FIG. 5 from another angle.
Figure 8:
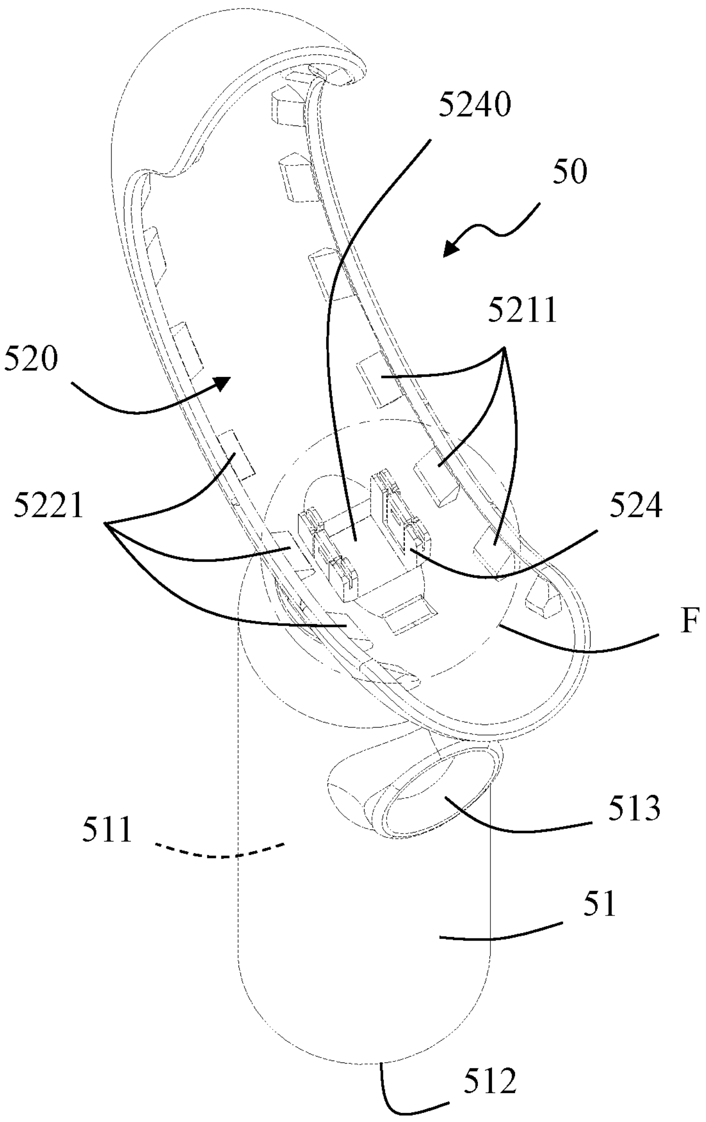
FIG. 8 is a schematic perspective view of a second housing portion in FIG. 5.

Referring to FIG. 5 to FIG. 7, the body portion 211 further includes a first side wall 213, a second side wall 214 opposite to the first side wall 213, and a slot 215 located between the first side wall 213 and the second side wall 214. The first side wall 213 includes an arc-shaped first retracted wall 2131. The first retracted wall 2131 defines a plurality of first installation holes 2130 spaced along a circumferential direction. The second side wall 214 includes an arc-shaped second retracted wall 2141. The second retracted wall 2141 defines a plurality of second installation holes 2140 distributed along the circumferential direction at intervals. In other words, a thickness of the first retracted wall 2131 is smaller than that of the first side wall 213; and a thickness of the second retracted wall 2141 is smaller than that of the second side wall 214. Preferably, in the illustrated embodiment of the present disclosure, the plurality of first installation holes 2130 are evenly distributed along the circumferential direction. Each first installation hole 2130 is equidistant from a center of the circular opening 2110 in a radial direction. Similarly, the plurality of second installation holes 2140 are evenly distributed along the circumferential direction. Each second installation hole 2140 is equidistant from the center of the circular opening 2110 in the radial direction. In the illustrated embodiment of the present disclosure, a radial distance from each first installation hole 2130 to the center of the circular opening 2110 is also equal to a radial distance from each second installation hole 2140 to the center of the circular opening 2110.

Referring to FIG. 17, FIG. 19, FIG. 20, FIG. 26 and FIG. 27, the incentive assembly 22 includes an incentive element 221, a second sealing member 222 surrounding the incentive element 221, a third sealing member 223 connected to the second sealing member 222, a fourth sealing member 224 connected to the third sealing member 223, a pair of wires 225 connected to the incentive element 221, and a pair of conductive pieces 226 connected to the wires 225. In the illustrated embodiment of the present disclosure, the general concept of the first sealing member 23, the second sealing member 222, the third sealing member 223 and the fourth sealing member 224 is a sealing element.

In the illustrated embodiment of the present disclosure, the incentive element 221 is sleeved on the annular rib 3123 of the liquid storage cartridge assembly 30. The incentive element 221 is used for heating or vibrating the liquid storage cotton 32 after being energized, so as to atomize the adsorbed substance in the liquid storage cotton 32 into a gaseous state. The gaseous substance then flows out from the atomizing nozzle 212.

Referring to FIG. 26 and FIG. 27, in the illustrated embodiment of the present disclosure, the second sealing member 222 is a multi-layer annular structure made of soft sealing rubber. The second sealing member 222 is at least partially clamped between the first installation wall 2111 and the protruding portion 312 to achieve the purpose of sealing.

The third sealing member 223 is a multi-layer annular structure made of soft sealing rubber. The third sealing member 223 is inserted into the first installation through hole 2113*a* of the second installation wall 2112 and/or the second installation through hole 2114*a* of the post 2114 to achieve the purpose of sealing.

The fourth sealing member 224 is a multi-layer annular structure made of soft sealing rubber. The fourth sealing member 224 is at least partially inserted into the second installation through hole 2114*a* of the post 2114 to achieve the purpose of sealing.

Compared with related technologies, the first sealing member 23, the second sealing member 222, the third sealing member 223 and the fourth sealing member 224 provided in the present disclosure can provide a high degree of sealing so as to prevent leakage.

Figure 19:
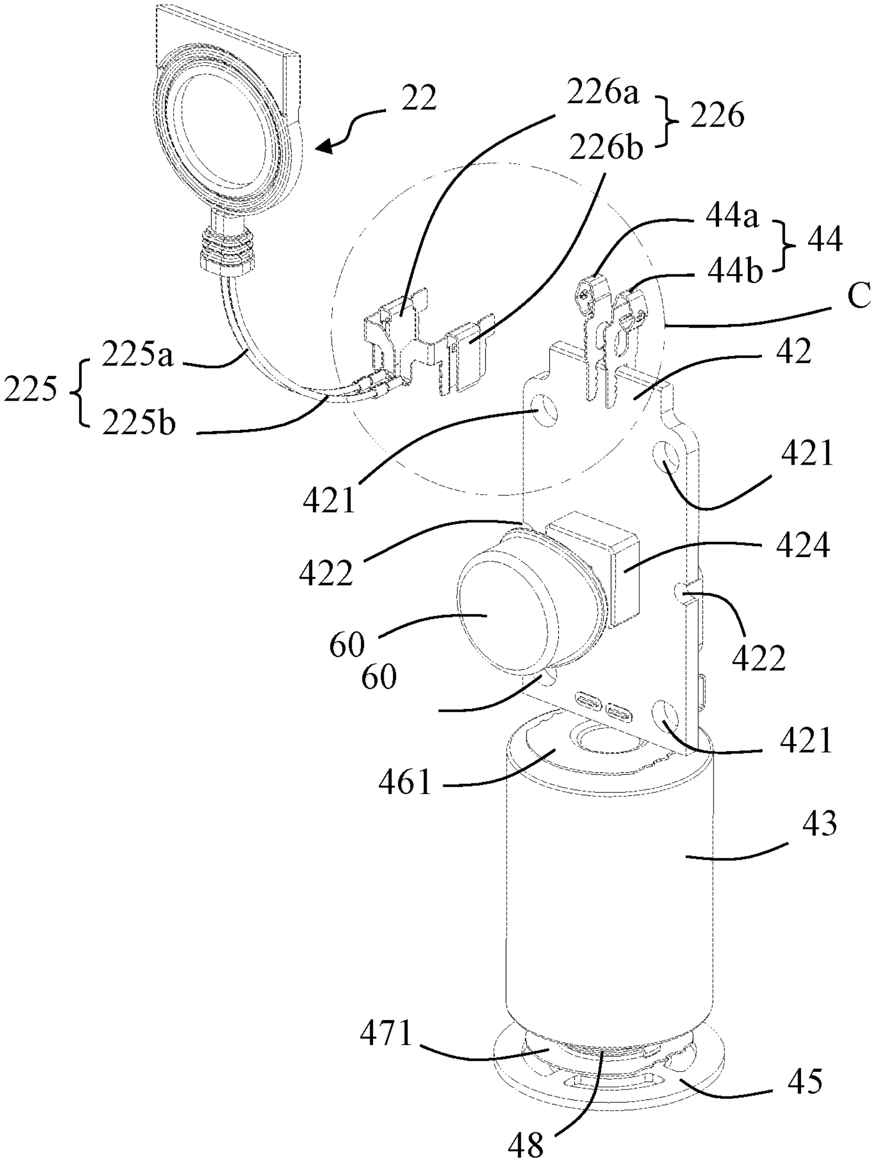
FIG. 19 is a schematic perspective view of a part of the battery assembly when it is separated from the incentive assembly.
Figure 20:
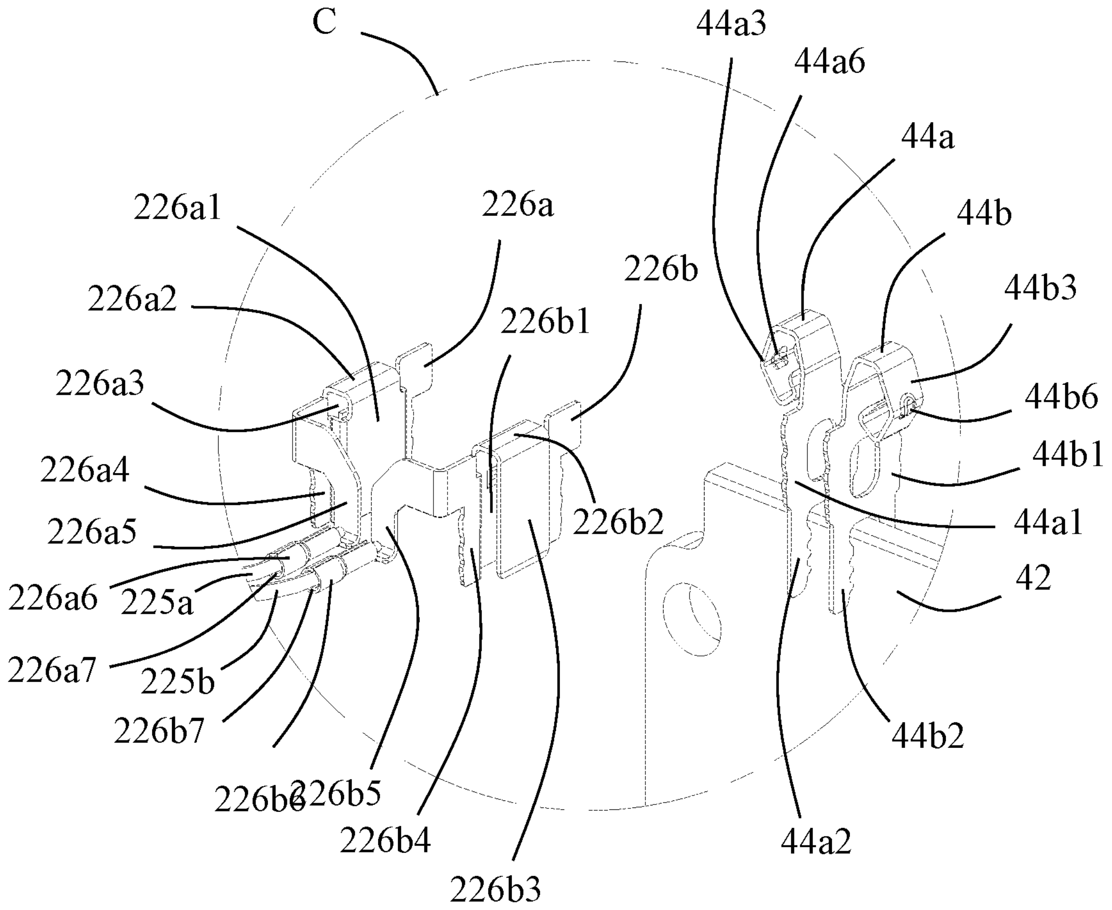
FIG. 20 is a partial enlarged view of a circled portion C in FIG. 19.
Figure 21:
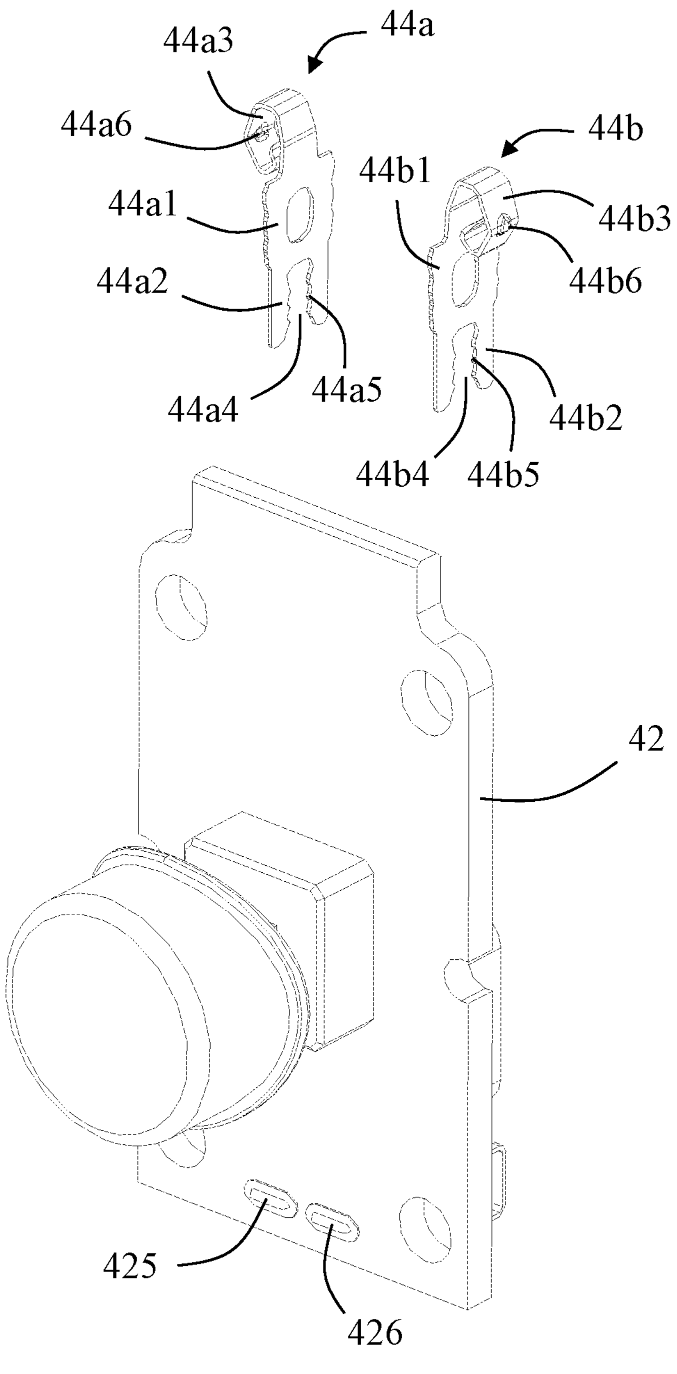
FIG. 21 is a perspective exploded view of part of the battery assembly in FIG. 19, wherein both the first conductive terminal and the second conductive terminal are separated from the built-in circuit board.
Figure 22:
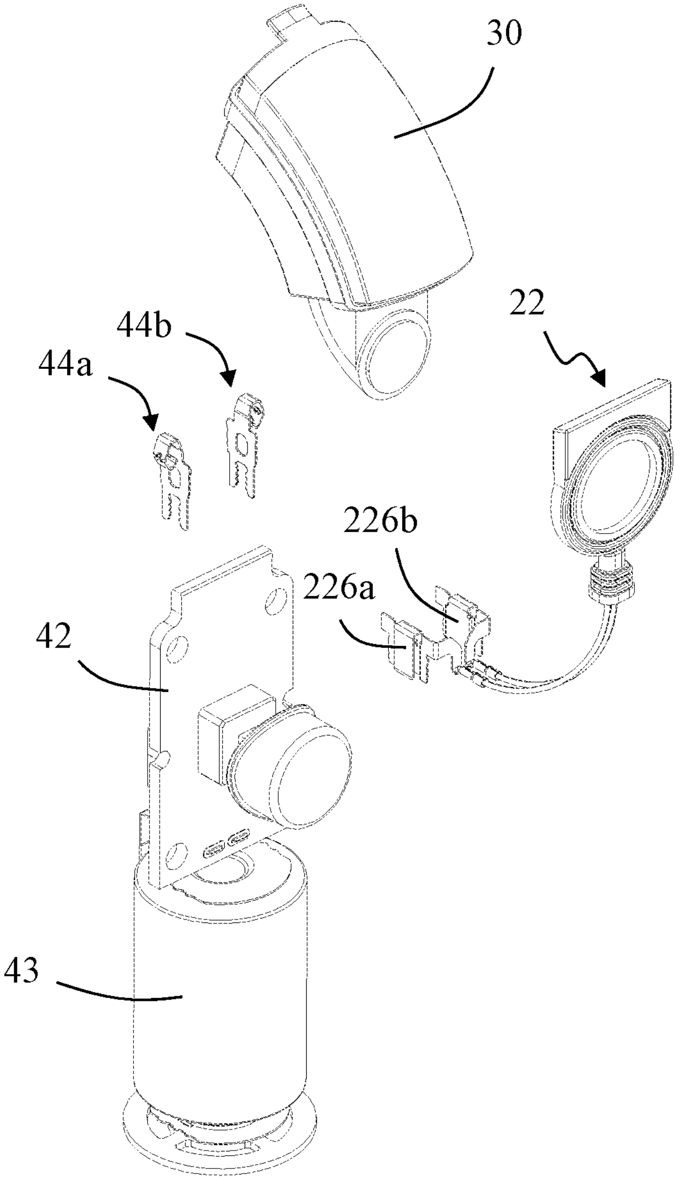
FIG. 22 is another further perspective exploded view of FIG. 19.

Referring to FIG. 19 and FIG. 20, in the illustrated embodiment of the present disclosure, the wires 225 pass through the third sealing member 223 and the fourth sealing member 224 to extend beyond the fourth sealing member 224. In the illustrated embodiment of the present disclosure, the wires 225 includes a first wire 225*a* and a second wire 225*b*.

The conductive pieces 226 include a first conductive piece 226*a* and a second conductive piece 226*b*. The first conductive piece 226*a* includes a first contact portion 226*a*1, a first bent portion 226*a*2 bent outward from a top of the first contact portion 226*a*1, a first retaining portion 226*a*3 bent from the first bent portion 226*a*2, a first fixing portion 226*a*4 extending from the first contact portion 226*a*1, a first adjusting portion 226*a*5 bent from the first fixing portion 226*a*4 toward the second conductive piece 226*b*, and a first connecting portion 226*a*6 extending from the first adjusting portion 226*a*5. In the illustrated embodiment of the present disclosure, the first contact portion 226*a*1, the first bent portion 226*a*2 and the first retaining portion 226*a*3 together form a U-shape. The first contact portion 226*a*1 is located inside the first retaining portion 226*a*3 and parallel to the first retaining portion 226*a*3. The first retaining portion 226*a*3 is used for being fixed to the handle assembly 10. The first contact portion 226*a*1 is of a flat plate configuration. The first connecting portion 226*a*6 defines a first fixing hole 226*a*7 for receiving the first wire 225*a*. The first connecting portion 226*a*6 is fixedly connected to the first wire 225*a* by crimping (for example, riveting). In this way, the first wire 225*a* does not need to be connected to the first connecting portion 226*a*6 in complicated ways such as welding, thereby saving costs. In the illustrated embodiment of the present disclosure, the first fixing hole 226*a*7 extends along a direction perpendicular to a wall surface of the first adjusting portion 226*a*5. The first adjusting portion 226*a*5 can function as a limit when the first wire 225*a* is inserted into the first fixing hole 226*a*7.

Similarly, the second conductive piece 226*b* includes a second contact portion 226*b*1, a second bent portion 226*b*2 bent outward from a top of the second contact portion 226*b*1, a second retaining portion 226*b*3 bent from the second bent portion 226*b*2, a second fixing portion 226*b*4 extending from the second contact portion 226*b*1, a second adjusting portion 226*b*5 bent from the second fixing portion 226*b*4 toward the first conductive piece 226*a*, and a second connecting portion 226*b*6 extending from the second adjusting portion 226*b*5. In the illustrated embodiment of the present disclosure, the second contact portion 226*b*1, the second bent portion 226*b*2 and the second retaining portion 226*b*3 together form a U-shape. The second contact portion 226*b* 1 is located inside the second retaining portion 226*b*3 and parallel to the second retaining portion 226*b*3. The second retaining portion 226*b*3 is used for being fixed to the handle assembly 10. The second contact portion 226*b* 1 is of a flat plate configuration. The second connecting portion 226*b*6 defines a second fixing hole 226*b*7 for receiving the second wire 225*b*. The second connecting portion 226*b*6 is fixedly connected to the second wire 225*b* by crimping (for example, riveting). In this way, the second wire 225*b* does not need to be connected to the second connecting portion 226*b*6 through complicated methods such as welding, thereby saving costs. In the illustrated embodiment of the present disclosure, the second fixing hole 226*b*7 extends along a direction perpendicular to a wall surface of the second adjusting portion 226*b*5. The second adjusting portion 226*b*5 can function as a limit when the second wire 225*b* is inserted into the second fixing hole 226*b*7.

In the illustrated embodiment of the present disclosure, the first conductive piece 226*a* and the second conductive piece 226*b* are disposed symmetrically. A distance between the first contact portion 226*a*1 and the second contact portion 226*b* 1 is greater than a distance between the first connecting portion 226*a*6 and the second connecting portion 226*b*6. By providing such setting, on the one hand, it is beneficial to maintain the distance between the first contact portion 226*a*1 and the second contact portion 226*b*1, so as to facilitate contact with mating conductive terminals; on the other hand, the first connecting portion 226*a*6 and the second connecting portion 226*b*6 that are close to each other are beneficial to be connected to the first wire 225*a* and the second wire 225*b*, respectively.

Figure 15:
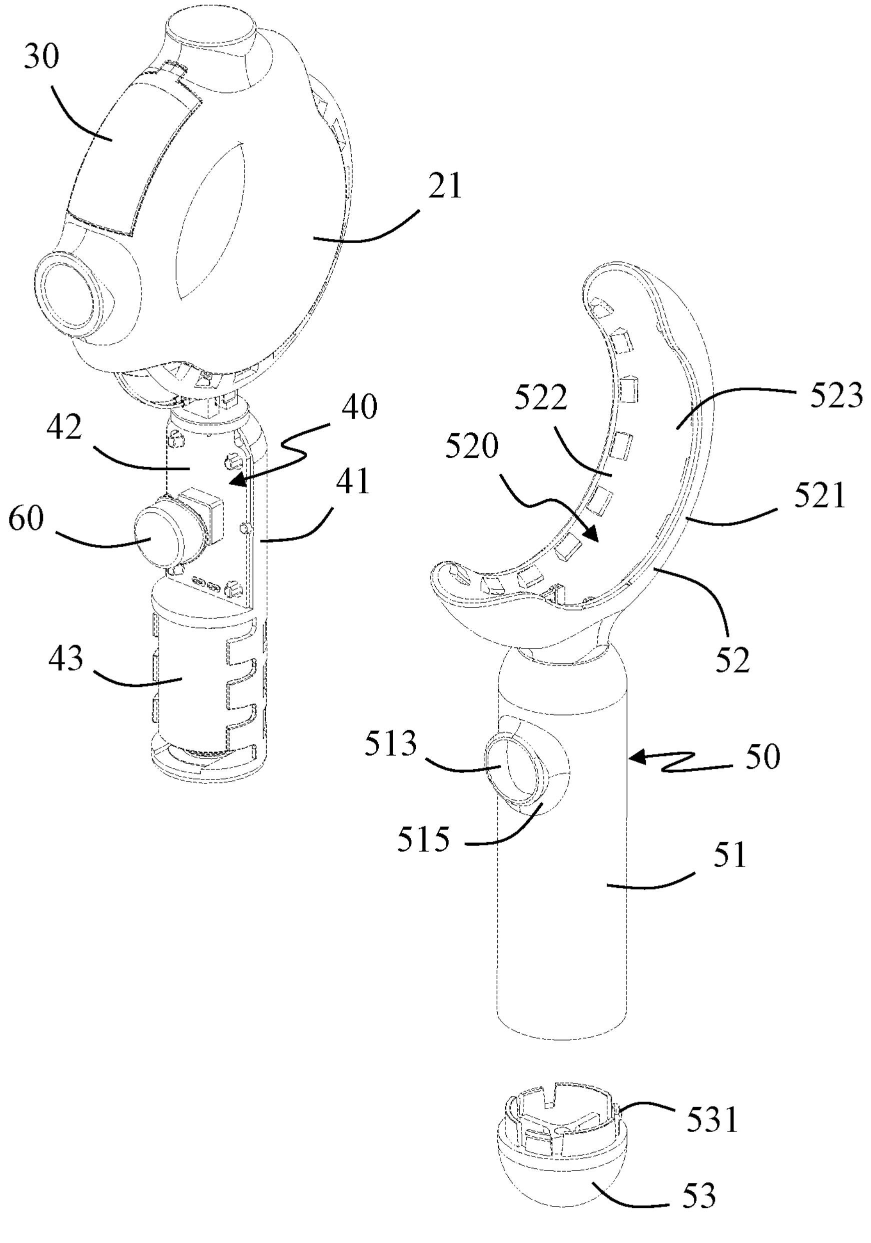
FIG. 15 is another partial perspective exploded view of FIG. 1.
Figure 16:
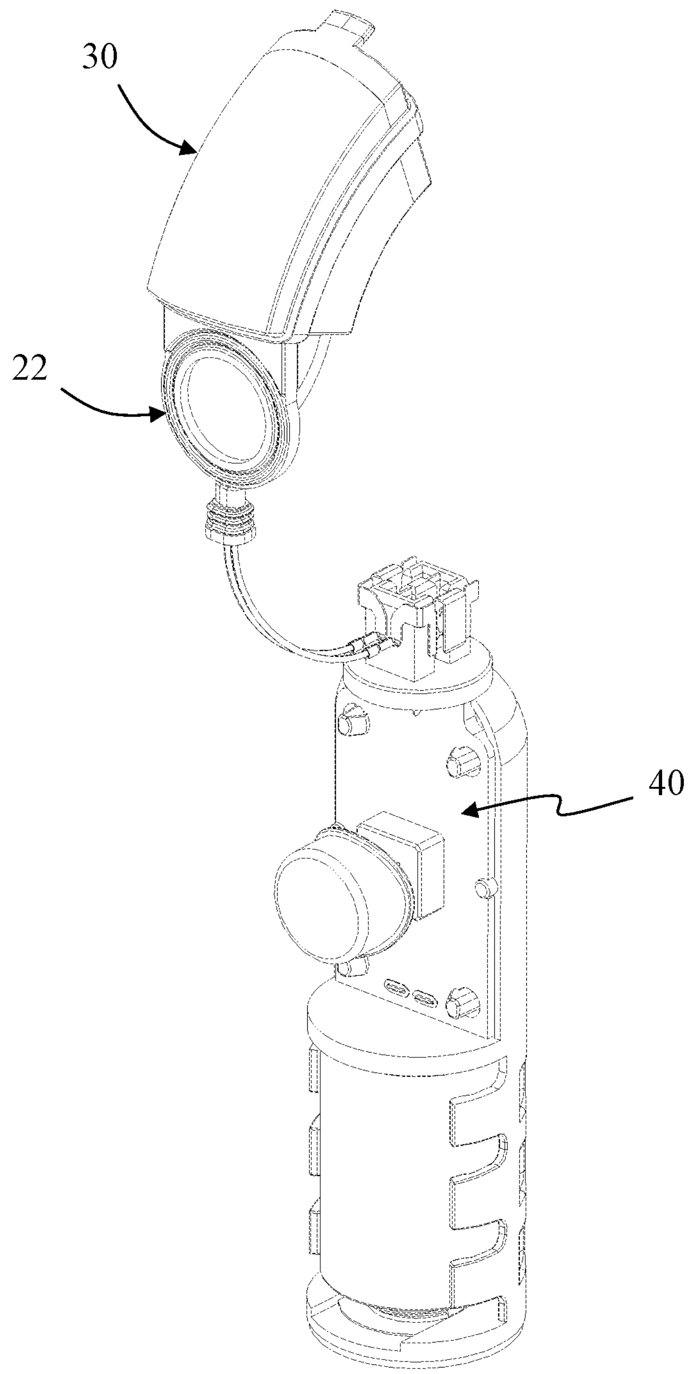
FIG. 16 is a schematic perspective view of the liquid storage cartridge assembly, the first sealing member, an incentive assembly and a battery assembly when they are assembled together.
Figure 17:
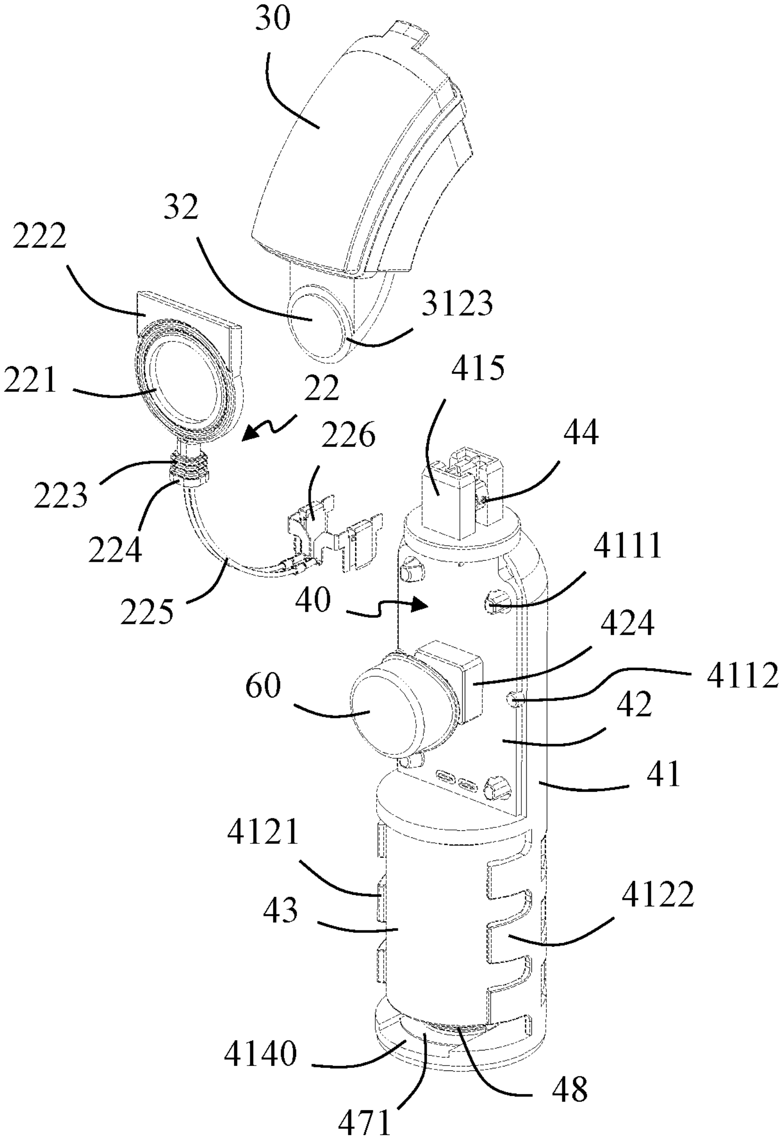
FIG. 17 is a partial perspective exploded view of FIG. 16.
Figure 18:
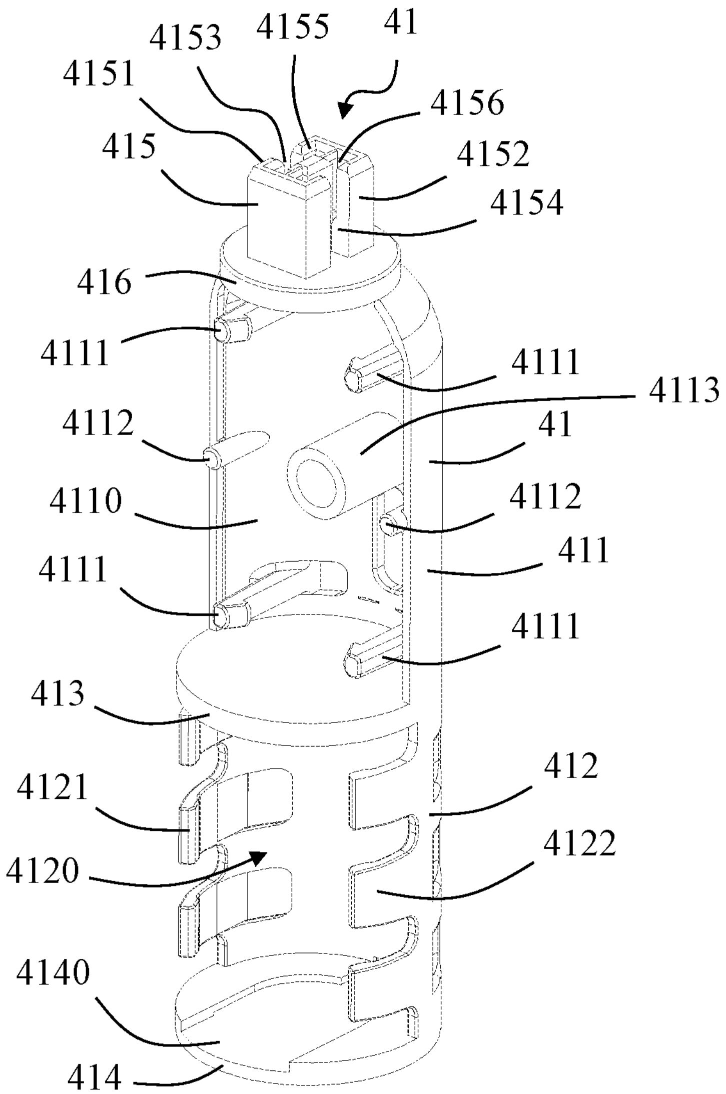
FIG. 18 is a schematic perspective view of a mounting seat in FIG. 17.

Referring to FIG. 15, the handle assembly 10 includes a battery assembly 40 and a casing assembly 50 mated with the battery assembly 40. In the illustrated embodiment of the present disclosure, the battery assembly 40 is at least partially inserted into the casing assembly 50.

The casing assembly 50 includes a handle portion 51, a second housing portion 52 connected to the handle portion 51, and an end cap 53 mated with the handle portion 51. The end cap 53 is provided with a plurality of claws 531.

Referring to FIG. 5, FIG. 8, FIG. 9 and FIG. 15, in the illustrated embodiment of the present disclosure, the handle portion 51 is substantially cylindrical. The handle portion 51 includes an inner space 511, an installation opening 512 communicating with the inner space 511, a button installation hole 513 communicating with the inner space 511, and a slot 514 communicating with the inner space 511. In the illustrated embodiment of the present disclosure, the installation opening 512 is located at a bottom of the handle portion 51. The button installation hole 513 is located at an upper end and a front of the handle portion 51. The slot 514 is located on a back of the handle portion 51. After the battery assembly 40 is received in the inner space 511 through the installation opening 512, the end cap 53 is installed and fixed to the handle portion 51. The claws 531 of the end cap 53 is locked on an inner wall of the handle portion 51. In the illustrated embodiment of the present disclosure, the handle portion 51 is provided with a raised portion 515. The button installation hole 513 extends through the raised portion 515.

Figure 9:
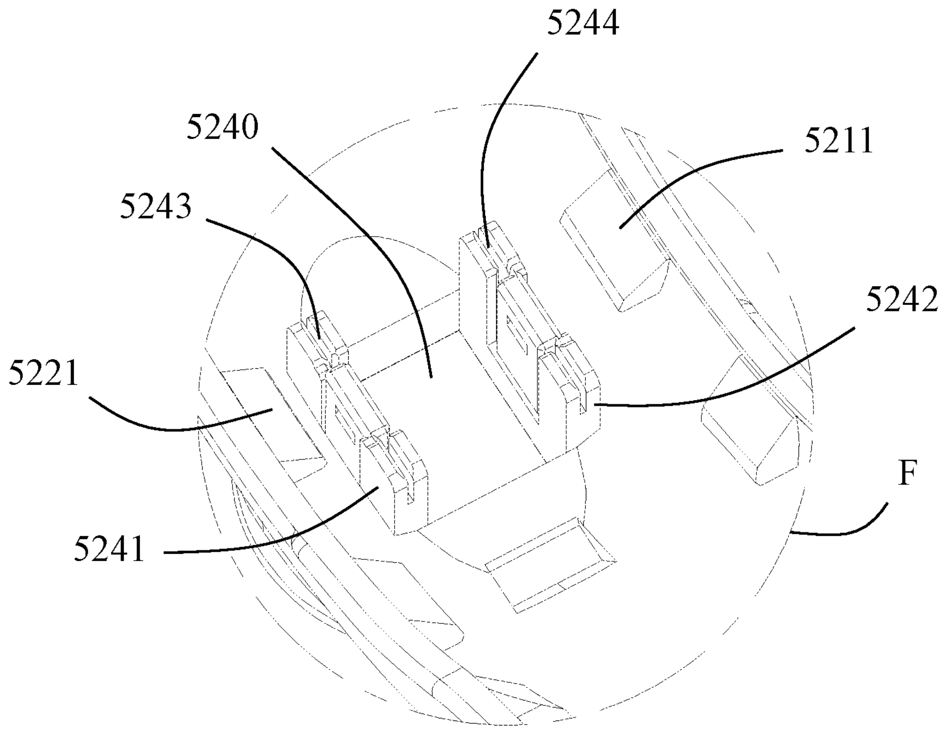
FIG. 9 is a partially enlarged view of a circled portion F in FIG. 8.
Figure 10:
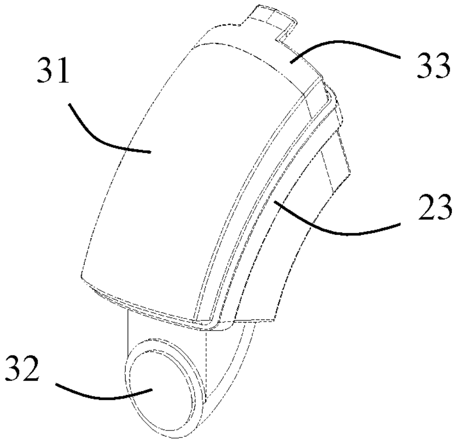
FIG. 10 is a schematic perspective view of a liquid storage cartridge assembly and a first sealing member in FIG. 5.
Figure 11:
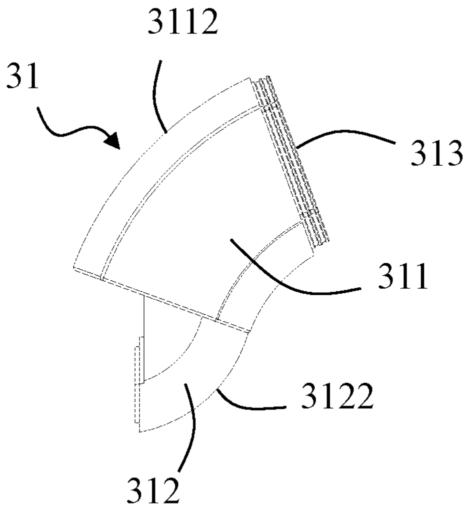
FIG. 11 is a front view of a liquid storage cartridge shell in FIG. 10.
Figure 12:
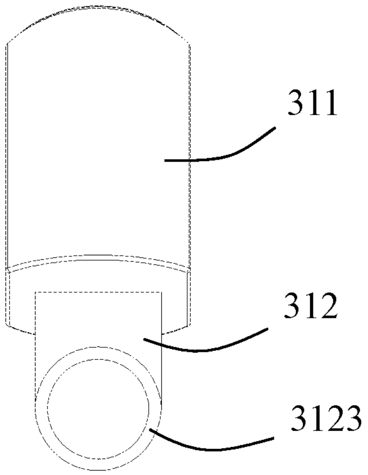
FIG. 12 is a left side view of the liquid storage cartridge shell shown in FIG. 10.
Figure 13:
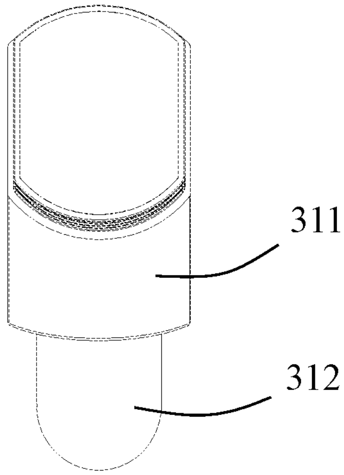
FIG. 13 is a right side view of the liquid storage cartridge shell shown in FIG. 10.
Figure 29:
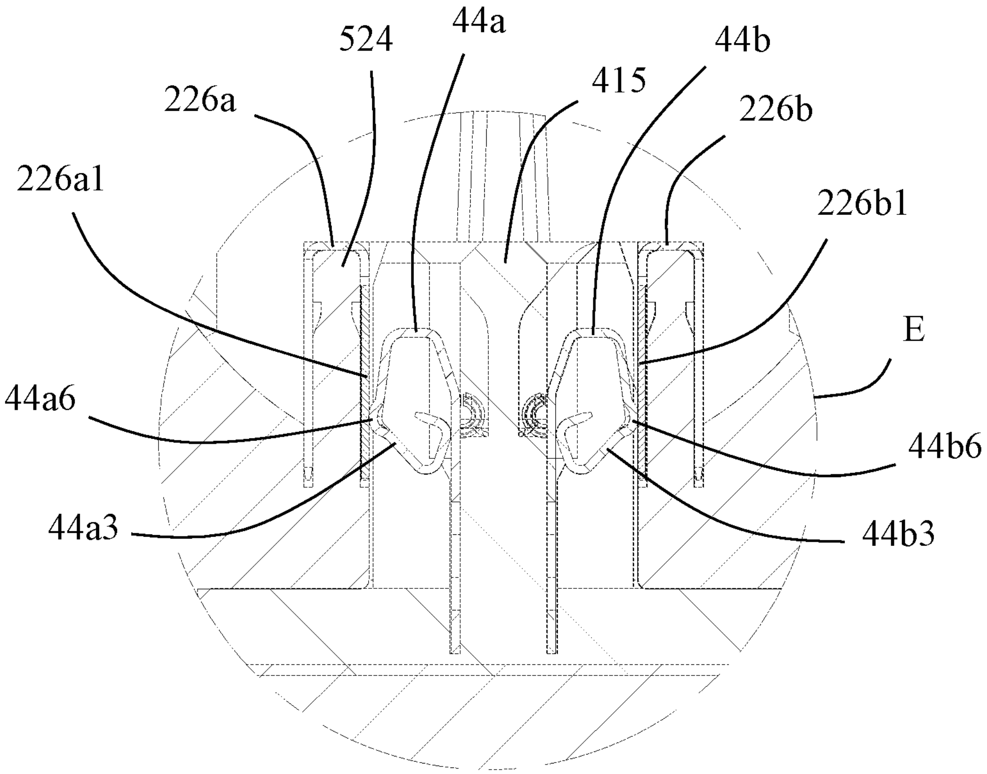
FIG. 29 is a partial enlarged view of a circled portion E in FIG. 28.

The second housing portion 52 is substantially C-shaped, and includes a third side wall 521, a fourth side wall 522 opposite to the third side wall 521, a connecting wall 523 connecting the third side wall 521 and the fourth side wall 522, an arc-shaped groove 520 jointly surrounded by the third side wall 521, the fourth side wall 522 and the connecting wall 523, and an extending protrusion 524 protruding from the connecting wall 523 into the arc-shaped groove 520. The arc-shaped groove 520 communicates with the inner space 511. As shown in FIG. 9 and FIG. 29, the extending protrusion 524 includes a first wall portion 5241, a second wall portion 5242 opposite to the first wall portion 5241, and a receiving groove 5240 located between the first wall portion 5241 and the second wall portion 5242. The first wall portion 5241 defines a first holding groove 5243 for fixing the first fixing portion **226*a*4. The second wall portion 5242 defines a second holding groove 5244 for fixing the second fixing portion 226*b*4. The first contact portion 226*a*1 and the second contact portion 226*b*1 are respectively located at two sides of the receiving groove 5240, and are exposed in the receiving groove 5240**.

In the illustrated embodiment of the present disclosure, an inner wall of the third side wall 521 is provided with a plurality of first installation protrusions 5211 protruding into the arc-shaped groove 520. The plurality of first installation protrusions 5211 are distributed at intervals along the circumferential direction. Preferably, in the illustrated embodiment of the present disclosure, the plurality of first installation protrusions 5211 are evenly distributed along the circumferential direction.

Similarly, an inner wall of the fourth side wall 522 is provided with a plurality of second installation protrusions 5221 protruding into the arc-shaped groove 520. The plurality of second installation protrusions 5221 are distributed at intervals along the circumferential direction. Preferably, in the illustrated embodiment of the present disclosure, the plurality of second installation protrusions 5221 are evenly distributed along the circumferential direction.

After assembly, the first housing portion 21 and the second housing portion 52 are locked and fixed together. The third side wall 521 covers the first retracted wall 2131. The first installation protrusions 5211 are locked in the corresponding first installation holes 2130. The fourth side wall 522 covers the second inner wall 2141. The second installation protrusions 5221 are locked in the corresponding second installation holes 2140.

In the present disclosure, the plurality of first installation protrusions 5211, the plurality of first installation holes 2130, the plurality of second installation protrusions 5221 and the plurality of second installation holes 2140 are all arranged in a circular array with equal diameters and equal distances in the radial direction. The force of the fixing structures is directed toward the center (for example, the center of the circular opening 2110), and the fixing structures arranged in an orderly quantity can share the external force in a balanced manner. Such an arrangement reduces the risk of the housing assembly 20 being cracked or even falling off due to damage by external force, and plays a highly anti-drop role.

Referring to FIG. 15 to FIG. 18, the battery assembly 40 includes a mounting seat 41, a built-in circuit board 42 installed on the mounting seat 41, a battery 43 installed on the mounting seat 41 and electrically connected to the built-in circuit board 42, a plurality of conductive terminals 44 electrically connected to the built-in circuit board 42, and an anti-vibration pad 45 installed on a bottom of the mounting seat 41.

In the illustrated embodiment of the present disclosure, the mounting seat 41 includes a first base 411, a second base 412, a first baffle 413, a second baffle 414, and a docking boss 415 integrally extends from the first base 411 in direction away from the second base 412. The docking boss 415 includes a first outer surface 4151, a second outer surface 4152 opposite to the first outer surface 4151, a first opening slot 4153 extending through a middle of the first outer surface 4151, a second opening slot 4154 extending through a middle of the second outer surface 4152, a first fixing slot 4155 extending through the docking boss 415 and communicating with the first opening slot 4153, and a second fixing slot 4156 extending through the docking boss 415 and communicating with the second opening slot 4154. An extending direction of the first fixing slot 4155 is perpendicular to that of the first opening slot 4153. An extending direction of the second fixing slot 4156 is perpendicular to the second opening slot 4154.

The first base 411 includes a first mounting groove 4110, a plurality of locking arms 4111 protruding beyond the first mounting groove 4110, limiting posts 4112 located on two sides of the first mounting groove 4110, and a supporting post 4113 configured to support the built-in circuit board 42. The mounting seat 41 further includes a third baffle 416 connected to the docking boss 415. The first mounting groove 4110 is located between the first baffle 413 and the third baffle 416.

The second base 412 includes a second mounting groove 4120, a plurality of first gripping claws 4121 located on one side of the second mounting groove 4120, and a plurality of second gripping claws 4122 located on the other side of the second mounting groove 4120. In the illustrated embodiment of the present disclosure, both the first gripping claws 4121 and the second gripping claws 4122 are arc-shaped. The second mounting groove 4120 is located between the first baffle 413 and the second baffle 414. An inner wall of the second baffle 414 is further provided with a fixing slot 4140 communicating with the second mounting groove 4120. The second mounting groove 4120 is used for receiving the battery 43. The first gripping claws 4121 and the second gripping claws 4122 are used to embrace the battery 43 in order to prevent the battery 43 from falling.

Referring to FIG. 17, FIG. 19, and FIG. 21 to FIG. 24, the built-in circuit board 42 includes a plurality of locking holes 421 that match the locking arms 4111, and a plurality of limiting grooves 422 matched with the limiting posts 4112. In addition, the built-in circuit board 42 further includes an electrical connector 423 (such as a Type C socket connector) disposed on the built-in circuit board 42, a button switch 424 located on the built-in circuit board 42, and a plurality of conductive metal pads (not shown) disposed at one end of the built-in circuit board 42. The electrical connector 423 corresponds to the slot 514 of the handle portion 51. That is, the electrical connector 423 is exposed from the slot 514 of the handle portion 51. The button switch 424 corresponds to the button installation hole 513. In the illustrated embodiment of the present disclosure, the button switch 424 and the electrical connector 423 are located on two opposite sides of the built-in circuit board 42, respectively.

Figure 23:
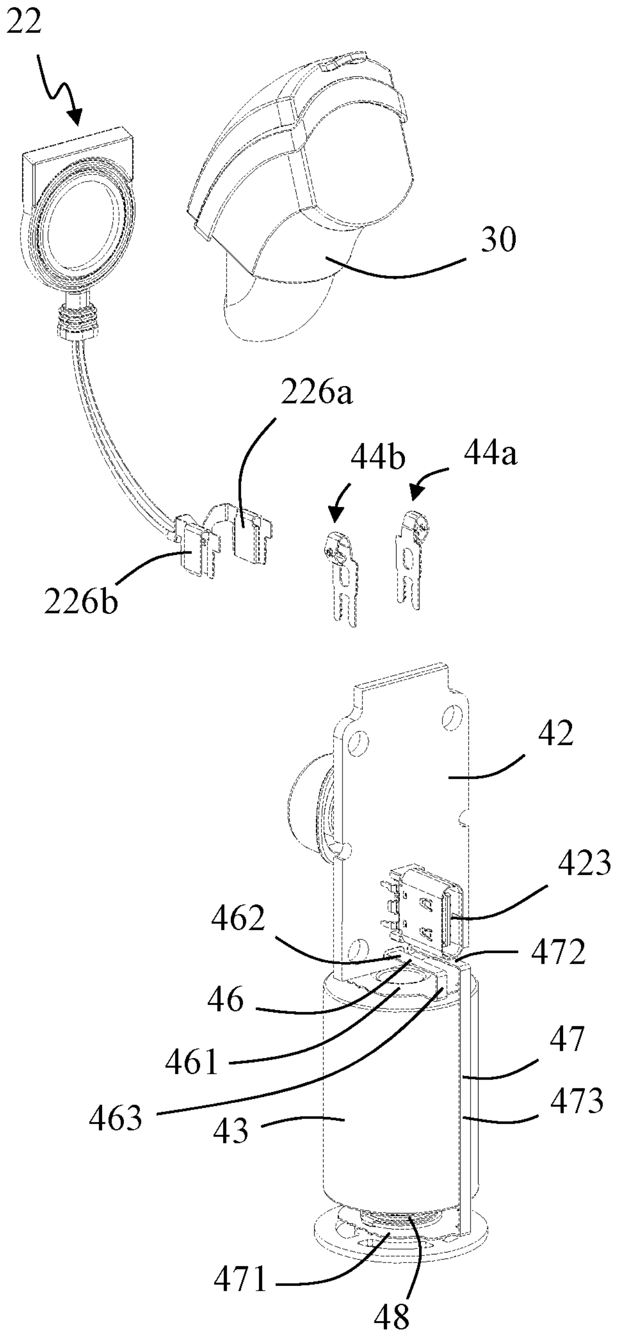
FIG. 23 is an exploded perspective view of FIG. 22 from another angle.
Figure 24:
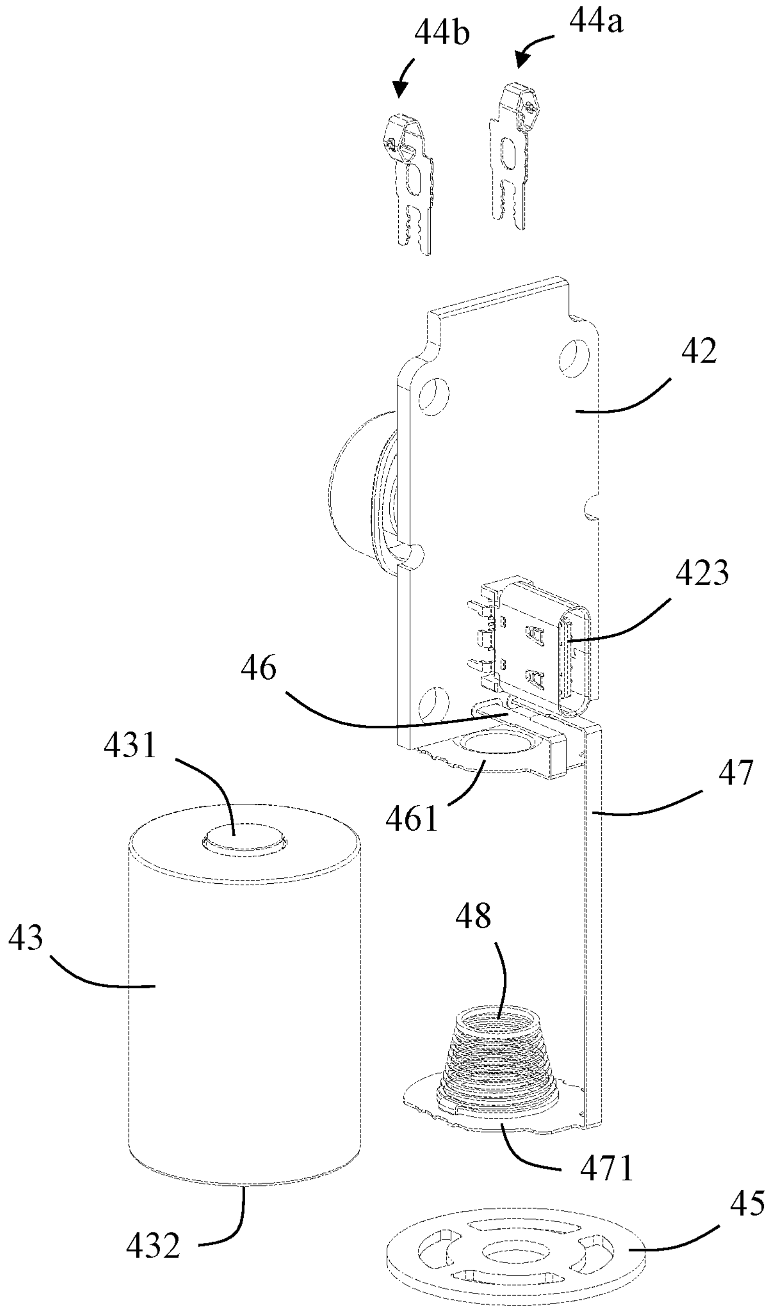
FIG. 24 is a further perspective exploded view after removing the liquid storage cartridge assembly, the first sealing member and the incentive assembly in FIG. 23.
Figure 25:
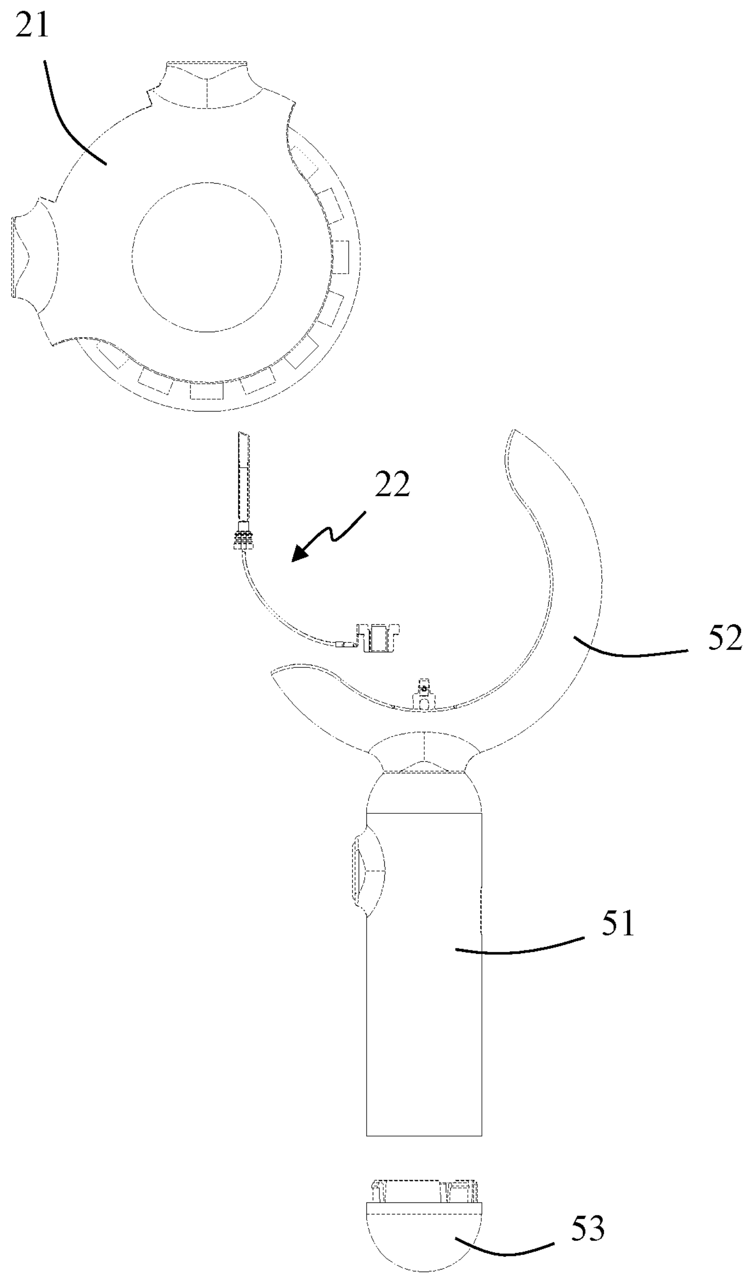
FIG. 25 is an exploded front view of some components in FIG. 1.

Referring to FIG. 23 and FIG. 24, the battery assembly 40 further includes a first connection terminal 46 electrically connected to the built-in circuit board 42, a second connection terminal 47 electrically connected to the built-in circuit board 42, and a spring 48 connected to the second connection terminal 47. In the illustrated embodiment of the present disclosure, the first connection terminal 46 is a positive terminal, and the second connection terminal 47 is a negative terminal.

In the illustrated embodiment of the present disclosure, the first connection terminal 46 includes a first metal sheet 461, a first mounting portion 462, and a first bridging portion 463 connecting the first metal sheet 461 and the first mounting portion 462. In the illustrated embodiment of the present disclosure, the first connection terminal 46 is roughly U-shaped, wherein the first mounting portion 462 is located at one end of the first connection terminal 46, and the first metal sheet 461 is located at the other end of the first connection terminal 46. The first metal sheet 461 is parallel to the first mounting portion 462. The first bridging portion 463 is perpendicular to the first metal sheet 461 and the first mounting portion 462. The first mounting portion 462 is electrically connected to the built-in circuit board 42. In the illustrated embodiment of the present disclosure, the built-in circuit board 42 includes a first conductive hole 425. The first mounting portion 462 is inserted into the first conductive hole 425 to be electrically connected to the built-in circuit board 42.

The second connection terminal 47 includes a second metal sheet 471, a second mounting portion 472, and a second bridging portion 473 connecting the second metal sheet 471 and the second mounting portion 472. In the illustrated embodiment of the present disclosure, the second connection terminal 47 is substantially U-shaped, wherein the second mounting portion 472 is located at one end of the second connection terminal 47, and the second metal sheet 471 is located at the other end of the second connection terminal 47. The second metal sheet 471 is parallel to the second mounting portion 472. The second bridging portion 473 is perpendicular to the second metal sheet 471 and the second mounting portion 472. The spring 48 is in contact with the second metal sheet 471. Preferably, the spring 48 is fixed to the second metal sheet 471. The second mounting portion 472 is electrically connected to the built-in circuit board 42. In the illustrated embodiment of the present disclosure, the built-in circuit board 42 includes a second conductive hole 426. The second mounting portion 472 is inserted into the second conductive hole 426 to be electrically connected to the built-in circuit board 42.

In the illustrated embodiment of the present disclosure, the battery 43 is a cylindrical battery including a positive electrode 431 and a negative electrode 432. The positive electrode 431 of the battery 43 is in contact with the first metal sheet 461. The negative electrode 432 of the battery 43 is in contact with the second metal sheet 471. In this way, the battery 43 can provide power for the electronic components on the built-in circuit board 42. In the illustrated embodiment of the present disclosure, the first metal sheet 461 abuts against the first baffle 413 and is exposed in the second mounting groove 4120. The second metal sheet 471 is fixed in the fixing slot 4140 of the second baffle 414. The spring 48 protrudes into the second mounting groove 4120.

In addition, in the illustrated embodiment of the present disclosure, the electrical connector 423 is connected to the battery 43 through the built-in circuit board 42, the first connection terminal 46 and the second connection terminal 47. In this way, the battery 43 can be charged by inserting a mated plug connector into the electrical connector 423 and powering on. In addition, the connection method with the battery 43 adopted in the present disclosure is beneficial to improve the stable conduction between the first connection terminal 46 and the second connection terminal 47 with the positive pole 431 and the negative pole 432 of the battery 43, respectively, thereby enabling continuous stabilization of electrical performance.

Referring to FIG. 19 to FIG. 21, and FIG. 29, in the illustrated embodiment of the present disclosure, the conductive terminals 44 include a first conductive terminal **44*a* and a second conductive terminal 44*b*. The first conductive terminal 44*a* and the second conductive terminal 44*b* are in contact with the conductive metal pads (not shown) on the built-in circuit board 42**, respectively.

The first conductive terminal **44*a* includes a first base portion 44*a*1, a first claw 44*a*2 extending integrally from one end of the first base portion 44*a*1, and a first elastic arm 44*a*3 turned and bent from the other end of the first base portion 44*a*1. The first claw 44*a*2 is provided with a first locking groove 44*a*4 and a plurality of first abutting teeth 44*a*5 exposed in the first locking groove 44*a*4. The first locking groove 44*a*4 is used for partially receiving the built-in circuit board 42. The first abutting teeth 44*a*5 are used to clamp the built-in circuit board 42 and contact with the corresponding conductive metal pad on the built-in circuit board 42. In this way, the first conductive terminal 44*a* of the present disclosure does not need to be electrically connected to the built-in circuit board 42 through a complicated soldering process, and facilitates the disassembly of the first conductive terminal 44*a*. The first elastic arm 44*a*3 is provided with a first abutting portion 44*a*6. In the illustrated embodiment of the present disclosure, the first abutting portion 44*a*6** is provided with a first contact rib.

The second conductive terminal **44*b* includes a second base portion 44*b*1, a second claw 44*b*2 extending integrally from one end of the second base portion 44*b*1, and a second elastic arm 44*b*3 turned and bent from the other end of the second base portion 44*b*1. The second claw 44*b*2 is provided with a second locking groove 44*b*4 and a plurality of second abutting teeth 44*b*5 exposed in the second locking groove 44*b*4. The second locking groove 44*b*4 is used for partially receiving the built-in circuit board 42. The second abutting teeth 44*b*5 are used to clamp the built-in circuit board 42 and contact with the corresponding conductive metal pad on the built-in circuit board 42. In this way, the second conductive terminal 44*b* of the present disclosure does not need to be electrically connected to the built-in circuit board 42 through a complicated soldering process, and facilitates the disassembly of the second conductive terminal 44*b*. The second elastic arm 44*b*3 is provided with a second abutting portion 44*b*6. In the illustrated embodiment of the present disclosure, the second abutting portion 44*b*6** is provided with a second contact rib.

The first base portion **44*a*1 is fixed in the first fixing slot 4155. The first claw 44*a*2 passes through the first fixing slot 4155, and protrudes beyond the docking boss 415 and the third baffle 416. The first elastic arm 44*a*3 is partially received in the first opening slot 4153. The first abutting portion 44*a*6 protrudes outward beyond the docking boss 415 to elastically abut against the first contact portion 226*a*1 of the first conductive piece 226*a***.

The second base portion **44*b*1 is fixed in the second fixing slot 4156. The second claw 44*b*2 passes through the second fixing slot 4156, and protrudes beyond the docking boss 415 and the third baffle 416. The second elastic arm 44*b*3 is partially received in the second opening slot 4154. The second abutting portion 44*b*6 protrudes outward beyond the docking boss 415 to elastically abut against the second contact portion 226*b*1 of the second conductive piece 226*b***.

Referring to FIG. 14, FIG. 15 and FIG. 26, the handle assembly 10 further includes a button 60 installed in the button installation hole 513 and mated with the button switch 424. In the illustrated embodiment of the present disclosure, the button 60 is made of soft rubber material, so that the button 60 can be deformed when assembled into the button installation hole 513. In the illustrated embodiment of the present disclosure, the button 60 includes a pressing body portion 61 and an enlarged portion 62 connected to the pressing body portion 61. The pressing body portion 61 further defines a receiving hole 611 for receiving the button switch 424. When the button 60 is installed into the button installation hole 513 in a manner of extrusion deformation, the button 60 releases the elastic force, so that the enlarged portion 62 can abut against an inner side of the handle portion 51, thereby preventing the button 60 from falling off from the handle portion 51. In an alternative embodiment of the present disclosure, the button 60 is hermetically installed in the button installation hole 513 of the handle portion 51 to better protect the built-in circuit board 42 from water and dust.

When assembling the atomization device 100, the battery assembly 40 may be assembled first. At this time, the built-in circuit board 42 is installed in the first mounting groove 4110 of the first base 411. Two ends (for example, upper and lower ends) of the built-in circuit board 42 are restricted between the first baffle 413 and the third baffle 416, respectively. The built-in circuit board 42 is supported on the supporting post 4113. The locking holes 421 of the built-in circuit board 42 are sleeved on the corresponding locking arms 4111, and the locking arms 4111 passing through the built-in circuit board 42 hold the built-in circuit board 42 through hooks at their ends. At the same time, the limiting groove 422 of the built-in circuit board 42 mates with the corresponding limiting post 4112. Then, the first connection terminal 46 and the second connection terminal 47 are electrically connected to the built-in circuit board 42. The first metal sheet 461 of the first connection terminal 46 is located on the top of the second mounting groove 4120. The second metal sheet 471 of the second connection terminal 47 and the spring 48 are located at the bottom of the second mounting groove 4120. Then, the battery 43 is assembled in the second mounting groove 4120. The positive electrode 431 of the battery 43 is in contact with the first metal sheet 461. The negative electrode 432 of the battery 43 is in contact with the second metal sheet 471 through the spring 48. The first gripping claws 4121 and the second gripping claws 4122 embrace the battery 43 to prevent the battery 43 from falling. The first gripping claws 4121 and the second gripping claws 4122 are self-adaptive elastic holding structures, so as to make up for the loose assembly of the battery 43 caused by manufacturing errors or the expansion caused by use. Then, the first conductive terminal **44*a* and the second conductive terminal 44*b* are inserted along a longitudinal direction of the mounting seat 41 and pass through the mating boss 415. The first base portion 44*a*1 is fixed in the first fixing slot 4155. The second base portion 44*b*1 is fixed in the second fixing slot 4156. The first claw 44*a*2 passes through the first fixing slot 4155 and protrudes beyond the docking boss 415 and the third baffle 416. The second claw 44*b*2 passes through the second fixing slot 4156 and protrudes beyond the docking boss 415 and the third baffle 416. The first claw 44*a*2 and the second claw 44*b*2 are in contact with the corresponding conductive metal pads on the built-in circuit board 42, respectively, so as to realize the electrical connection of the first conductive terminal 44*a* and the second conductive terminal 44*b* with the built-in circuit board 42. The first elastic arm 44*a*3 is partially received in the first opening slot 4153. The second elastic arm 44*b*3 is partially received in the second opening slot 4154. The first abutting portion 44*a*6 protrudes outward beyond the docking boss 415 to elastically abut against the first contact portion 226*a*1 of the first conductive piece 226*a*. The second abutting portion 44*b*6 protrudes outward beyond the docking boss 415 to elastically abut against the second contact portion 226*b*1 of the second conductive piece 226*b*. In addition, the first conductive terminal 44*a* and the second conductive terminal 44*b* are assembled on the docking boss 415. The first claw 44*a*2 and the second claw 44*b*2 can hold and fix the built-in circuit board 42. The anti-vibration pad 45 is mounted on the bottom of the second baffle 414**.

The first conductive piece **226*a* and the second conductive piece 226*b* are crimped and fixed to the first wire 225*a* and the second wire 225*b*, respectively. Then, the first conductive piece 226*a* and the second conductive piece 226*b* are assembled to the extending protrusion 524 of the second housing portion 52**.

Then, the battery assembly 40 is assembled into the inner space 511 of the handle portion 51 from the installation opening 512 along the extending direction of the handle portion 51. The docking boss 415 together with the first elastic arm **44*a*3 and the second elastic arm 44*b*3 are inserted into the receiving groove 5240 of the extending protrusion 524. The first elastic arm 44*a*3 and the second elastic arm 44*b*3 elastically abut against the first contact portion 226*a*1 of the first conductive piece 226*a* and the second contact portion 226*b* 1 of the second conductive piece 226*b***, respectively.

Then, the end cap 53 is installed and fixed to the bottom of the handle portion 51. The anti-vibration pad 45 interacts internally with the end cap 53 and the handle portion 51, so that the atomization device 100 is not easy to loosen and does not produce abnormal noise during use.

Then, the housing assembly 20 is assembled with the handle assembly 10. The first installation protrusions 5211 and the second installation protrusions 5221 of the casing assembly 50 are locked in the first installation holes 2130 and the second installation holes 2140 of the housing assembly 20, respectively. After assembly, the first retracted wall 2131 and the second retracted wall 2141 of the first housing portion 21 are accommodated in the arc-shaped groove 520 of the second housing portion 52. The first retracted wall 2131 of the first housing portion 21 is engaged with the inner side of the third side wall 521 of the second housing portion 52. The second retracted wall 2141 of the first housing portion 21 is engaged with the inner side of the fourth side wall 522 of the second housing portion 52. The third side wall 521 is flush with the outer surface of the first side wall 213 and transitions smoothly. The fourth side wall 522 is flush with the outer surface of the second side wall 214 and transitions smoothly.

Finally, the liquid storage cartridge assembly 30 is rotatably installed in the installation cavity 210 of the housing assembly 20. Specifically, the protruding portion 312 of the liquid storage cartridge shell 31 is inserted obliquely into the installation cavity 210 first, and then rotates downward with the rotating hinged circular surface 3122 of the protruding portion 312 as a fulcrum, and finally the liquid storage cartridge assembly 30 is installed in the installation cavity 210 of the housing assembly 20.

It is understandable to those skilled in the art that the above assembly steps can be flexibly adjusted to realize automatic assembly, improve production efficiency, and reduce costs.

Figure 3:
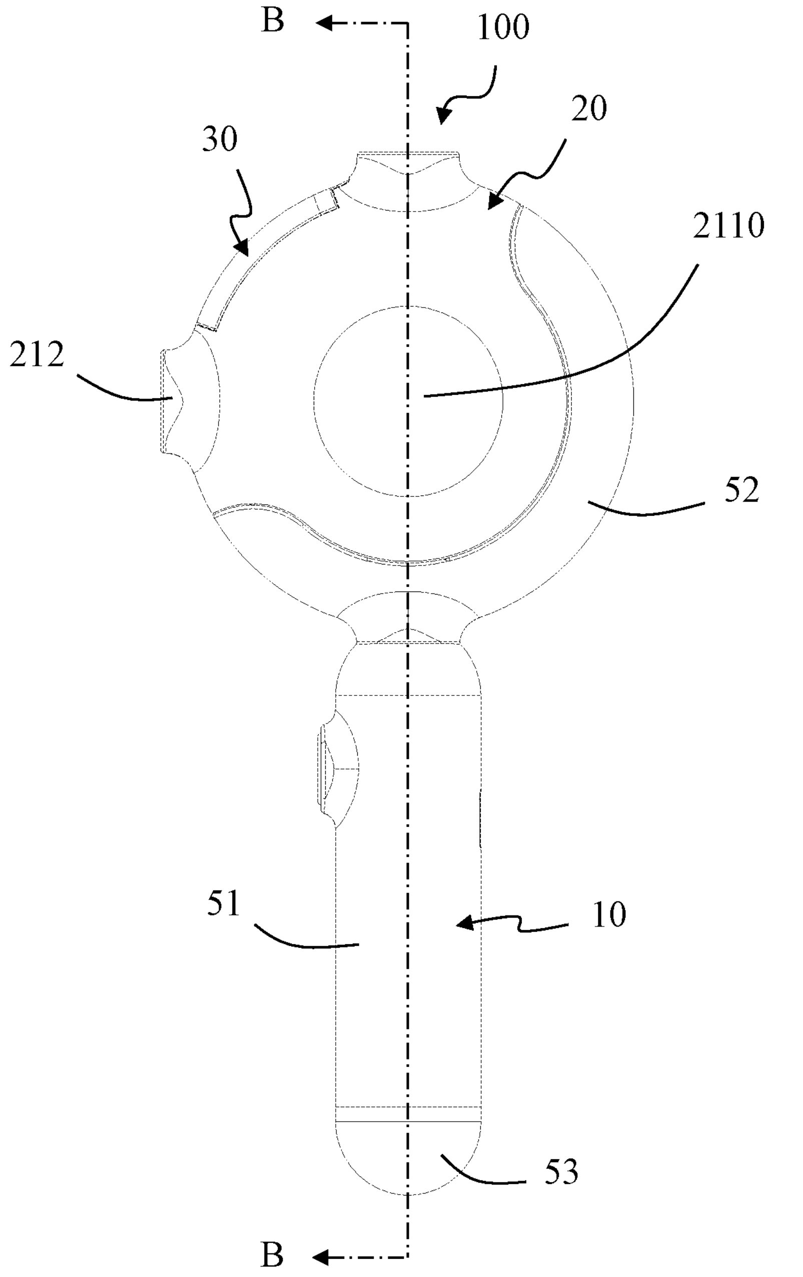
FIG. 3 is a front view of FIG. 1.
Figure 4:
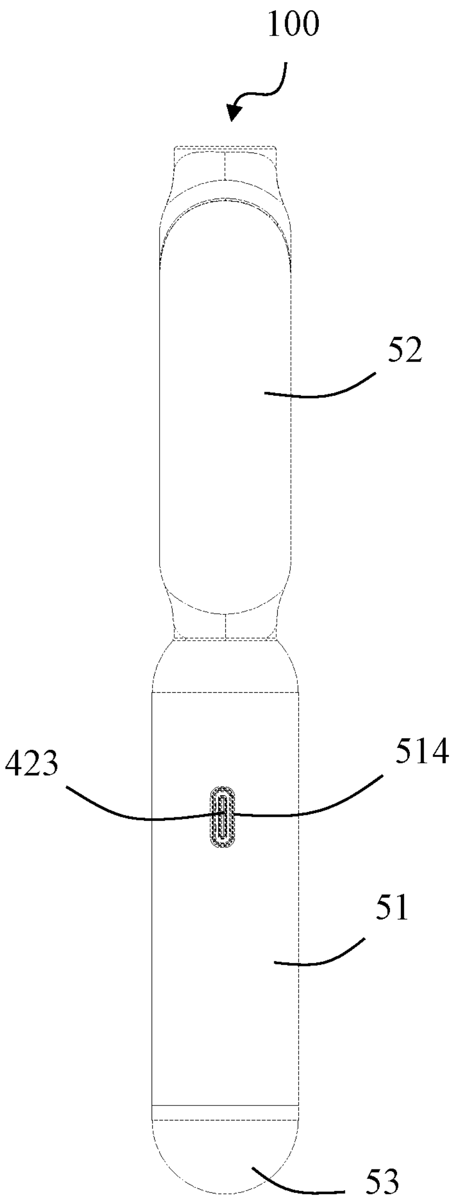
FIG. 4 is a right view of FIG. 1.

As shown in FIG. 3, when the atomization device 100 is assembled, the outer surfaces of the first housing portion 21, the second housing portion 52 and the liquid storage cartridge shell 31 are smoothly transitioned to each other, so that the atomization device 100 looks roughly annular so as to improve aesthetics.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An atomization device, comprising:

a housing assembly comprising a first housing portion and an incentive assembly at least partially located in the first housing portion; the incentive assembly comprising an incentive element, a first wire and a second wire connected to the incentive element, and a first conductive piece and a second conductive piece connected to the first wire and the second wire, respectively; the first conductive piece comprising a first contact portion; the second conductive piece comprising a second contact portion; and a handle assembly comprising a casing assembly and a battery assembly at least partially installed in the casing assembly; the casing assembly comprising a second housing portion; the second housing portion comprising an arc-shaped groove and an extending protrusion protruding into the arc-shaped groove; the extending protrusion comprising a first wall portion, a second wall portion opposite to the first wall portion, and a receiving groove located between the first wall portion and the second wall portion; the first conductive piece and the second conductive piece being fixed on the extending protrusion; the first contact portion and the second contact portion being respectively located on two sides of the receiving groove, and are exposed in the receiving groove;

wherein the battery assembly comprises a mounting seat, a built-in circuit board installed on the mounting seat, a battery installed on the mounting seat and electrically connected to the built-in circuit board, and a first conductive terminal and a second conductive terminal electrically connected to the built-in circuit board; the first conductive terminal comprises a first elastic arm; the second conductive terminal comprises a second elastic arm; and wherein the mounting seat comprises a docking boss; the docking boss comprises a first outer surface and a second outer surface opposite to the first outer surface; the first elastic arm protrudes beyond the first outer surface; the second elastic arm protrudes beyond the second outer surface; the docking boss is inserted into the receiving groove, so that the first elastic arm is in contact with the first contact portion, and the second elastic arm is in contact with the second contact portion.

2. The atomization device according to claim 1, wherein the first contact portion and the second contact portion are both of flat plate configurations.

3. The atomization device according to claim 1, wherein the first conductive piece comprises a first connecting portion; the first connecting portion defines a first fixing hole to receive the first wire; the first connecting portion is pressed against and fixed to the first wire; and wherein the second conductive piece comprises a second connecting portion; the second connecting portion defines a second fixing hole to receive the second wire; the second connecting portion is crimped and fixed to the second wire.

4. The atomization device according to claim 3, wherein a distance between the first contact portion and the second contact portion is greater than a distance between the first connecting portion and the second connecting portion.

5. The atomization device according to claim 3, wherein the first conductive piece comprises a first fixing portion extending from the first contact portion and a first adjusting portion bent from the first fixing portion toward the second conductive piece; the first connecting portion integrally extends from the first adjusting portion;

the first wall portion defines a first holding groove to fix the first fixing portion;

the second conductive piece comprises a second fixing portion extending from the second contact portion and a second adjusting portion bent from the second fixing portion toward the first conductive piece; the second connecting portion integrally extends from the second adjusting portion;

the second wall portion defines a second holding groove to fix the second fixing portion.

6. The atomization device according to claim 5, wherein the first fixing hole extends along a direction perpendicular to a wall surface of the first adjusting portion; the first adjusting portion is configured to limit a position of the first wire when the first wire is inserted into the first fixing hole; and wherein the second fixing hole extends along a direction perpendicular to a wall surface of the second adjusting portion; the second adjusting portion is configured to limit a position of the second wire when the second wire is inserted into the second fixing hole.

7. The atomization device according to claim 1, wherein the docking boss comprises a first fixing slot and a second fixing slot;

the first conductive terminal comprises a first base portion and a first claw; the first elastic arm and the first claw are integrally extended from two ends of the first base portion; the first base portion is fixed in the first fixing slot; the first claw extends beyond the docking boss to engage with the built-in circuit board;

the second conductive terminal comprises a second base portion and a second claw; the second elastic arm and the second claw are integrally extended from two ends of the second base portion; the second base portion is fixed in the second fixing slot; the second claw extends beyond the docking boss to engage with the built-in circuit board.

8. The atomization device according to claim 7, wherein the first claw comprises a first locking groove and a plurality of first abutment teeth exposed in the first locking groove; the built-in circuit board is partially inserted in the first locking groove; the first abutment teeth clamp the built-in circuit board and are in contact with a conductive metal pad on the built-in circuit board; and wherein the second claw comprises a second locking groove and a plurality of second abutment teeth exposed in the second locking groove; the built-in circuit board is partially inserted into the second locking groove; the second abutment teeth clamp the built-in circuit board and are in contact with a conductive metal pad on the built-in circuit board.

9. The atomization device according to claim 1, wherein the first housing portion comprises an installation cavity and an atomizing nozzle located on one side of the installation cavity;

the atomization device further comprises a liquid storage cartridge assembly detachably assembled in the installation cavity; the liquid storage cartridge assembly comprising a liquid storage cartridge shell, a liquid storage cotton detachably installed in the liquid storage cartridge shell, and an end cover that cooperates with the liquid storage cartridge shell to limit a position of the liquid storage cotton; the incentive element is configured to heat or vibrate the liquid storage cartridge assembly, so as to atomize a substance adsorbed in the liquid storage cotton into a gaseous state, and flow out from the atomizing nozzle.

10. The atomization device according to claim 1, wherein the mounting seat comprises a plurality of first gripping claws and a plurality of second gripping claws; the plurality of first gripping claws and the plurality of second gripping claws embrace the battery.

* * * * *